(12) United States Patent
Zhang et al.

(10) Patent No.: US 10,547,088 B2
(45) Date of Patent: Jan. 28, 2020

(54) HIGH COULOMBIC EFFICIENCY CYCLING OF METAL BATTERIES

(71) Applicant: Battelle Memorial Institute, Richland, WA (US)

(72) Inventors: Ji-Guang Zhang, Richland, WA (US); Brian D. G. Adams, Richland, WA (US); Wu Xu, Richland, WA (US); Jianming Zheng, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 734 days.

(21) Appl. No.: 15/142,322

(22) Filed: Apr. 29, 2016

(65) Prior Publication Data

US 2016/0240896 A1    Aug. 18, 2016

Related U.S. Application Data

(63) Continuation-in-part of application No. 14/869,647, filed on Sep. 29, 2015, now Pat. No. 10,170,795,
(Continued)

(51) Int. Cl.
*H01M 10/42* (2006.01)
*H01M 10/44* (2006.01)
(Continued)

(52) U.S. Cl.
CPC ......... *H01M 10/446* (2013.01); *H01M 4/136* (2013.01); *H01M 4/381* (2013.01);
(Continued)

(58) Field of Classification Search
CPC .. H02J 7/0042; H02J 7/007; H02J 7/04; H02J 7/041; H01M 10/446; H01M 10/0525;
(Continued)

(56) References Cited

U.S. PATENT DOCUMENTS 6,805,999 B2   10/2004  Lee et al.
8,722,256 B2    5/2014  Narula et al.
(Continued)

FOREIGN PATENT DOCUMENTS

| CN | 103123981 | 5/2013 |
| WO | WO 2013/004957 | 1/2013 |
| WO | WO 2015/080492 | 6/2015 |

OTHER PUBLICATIONS

Camacho-Forero et al., "Effects of high and low salt concentration in electrolytes at lithium-metal anode surfaces," *The Journal of Physical Chemistry C* (Dec. 30, 2016) 121(1):182-194.
(Continued)

*Primary Examiner* — Stephen J Yanchuk
(74) *Attorney, Agent, or Firm* — Klarquist Sparkman, LLP

(57) ABSTRACT

Embodiments of a method for cycling a rechargeable alkali metal battery with high Coulombic efficiency (CE) are disclosed. A slow charge/rapid discharge protocol is used in conjunction with a concentrated electrolyte to achieve high CE in rechargeable lithium and sodium batteries, include anode-free batteries. In some examples, the CE is ≥99.8%.

19 Claims, 8 Drawing Sheets

Related U.S. Application Data which is a continuation-in-part of application No. 14/482,312, filed on Sep. 10, 2014.

(51) Int. Cl.

| | |
|---|---|
| *H01M 10/054* | (2010.01) |
| *H01M 10/0568* | (2010.01) |
| *H01M 10/0569* | (2010.01) |
| *H01M 4/136* | (2010.01) |
| *H01M 4/66* | (2006.01) |
| *H02J 7/00* | (2006.01) |
| *H01M 4/38* | (2006.01) |
| *H01M 10/052* | (2010.01) |

(52) U.S. Cl.
CPC ............ *H01M 4/382* (2013.01); *H01M 4/661* (2013.01); *H01M 10/052* (2013.01); *H01M 10/054* (2013.01); *H01M 10/0568* (2013.01); *H01M 10/0569* (2013.01); *H02J 7/0042* (2013.01); *H01M 2300/0028* (2013.01); *H01M 2300/0037* (2013.01); *Y02T 10/7011* (2013.01)

(58) Field of Classification Search
CPC ........... H01M 10/054; H01M 10/0568; H01M 10/0569; H01M 10/052; H01M 4/136; H01M 4/661; H01M 4/5825; H01M 4/381; H01M 4/382; H01M 2/1653; H01M 2300/0037; H01M 2300/0028
See application file for complete search history.

(56) References Cited

U.S. PATENT DOCUMENTS

| | | | |
|---|---|---|---|
| 2004/0253510 | A1 | 12/2004 | Jonghe et al. |
| 2009/0212743 | A1 | 8/2009 | Hagiwara et al. |
| 2011/0104526 | A1 | 5/2011 | Boxley et al. |
| 2012/0326079 | A1* | 12/2012 | Kim .................... H01M 4/0471 252/182.1 |
| 2015/0050561 | A1 | 2/2015 | Zhang et al. |
| 2015/0295236 | A1 | 10/2015 | Senguttuvan et al. |
| 2016/0006078 | A1* | 1/2016 | Taeda .................. H01M 10/052 429/338 |
| 2016/0028122 | A1* | 1/2016 | Zhamu .............. H01M 10/0569 429/300 |
| 2016/0359158 | A1 | 12/2016 | Janakiraman et al. |

OTHER PUBLICATIONS

Final Office Action from U.S. Appl. No. 14/482,312, 15 pages (dated Jun. 27, 2017).

Gmyrek, "Effect of electrolyte concentration on the performance of batteries," *Honors Theses, Salem State University* (2014), 26 pages, retrieved from http://digitalcommons.salemstate.edu/honors_theses/26?utm_source=digitalcommons.salemstate.edu%Fhonors_theses%2F26&utm_medium=PDF&utm_campaign=PDFCoverPages.

Niedzicki et al., "Optimization of the lithium-ion cell electrolyte composition through the use of the LiTDI salt," *Electrochimica Acta* (Jan. 20, 2014) 117: 224-229.

Non-Final Office Action from U.S. Appl. No. 14/869,647, 11 pages (dated Aug. 8, 2017).

Aurbach, D., et al., "The Application of Atomic Force Microscopy for the Study of Li Deposition Processes," *Journal of the Electrochemical Society* 1996, 143(11):3525-3532.

Bates, J. B., et al., "Fabrication and characterization of amorphous lithium electrolyte thin films and rechargeable thin-film batteries," *Journal of Power Sources* 1993, 43-44:103-110.

Bates, J. B., et al., "Thin-film rechargeable lithium batteries," *Journal of Power Sources* 1995, 54:58-62.

Kim, J. et al., "Rechargeable Seawater Battery and Its Electrochemical Mechanism," *ChemElectroChem Communications* 2015, 2:328-332.

Lopez et al., "Morphological Transitions on Lithium Metal Anodes," *J. Electrochem. Soc.* 2009, 156:A726-A729. (Abstract only).

Neudecker, B. J., et al., "'Lithium-Free' Thin-Film Battery with In Situ Plated Li Anode," *Journal of the Electrochemical Society* 2000, 147(2):517-523.

Park, M. S., et al., "A Highly Reversible Lithium Metal Anode," *Scientific Reports* 2014, 4, article 3815, doi:10.1038/srep038515.

Qian et al., "High rate and stable cycling of lithium metal anode," *Nat. Commun.* 2015, 6:6362.

Steiger et al., "Microscopic observations of the formation, growth and shrinkage of lithium moss during electrodeposition and dissolution," *Electrochim. Acta* 2014, 136:529-536. (Abstract only).

Whittingham, M. S., "History, Evolution, and Future Status of Energy Storage," *Proceedings of the IEEE* 2012, 100:1518-1534.

Woo, J., et al., "Symmetrical Impedance Study on Inactivation Induced Degradation of Lithium Electrodes for Batteries Beyond Lithium-Ion," *Journal of the Electrochemical Society* 2014, 161(5):A827-A830.

Zheng et al., "Highly Stable Operation of Lithium Metal Batteries Enabled by the Formation of a Transient High-Concentration Electrolyte Layer," *Adv. Energy Mater.* 2016, 1502151.

\* cited by examiner

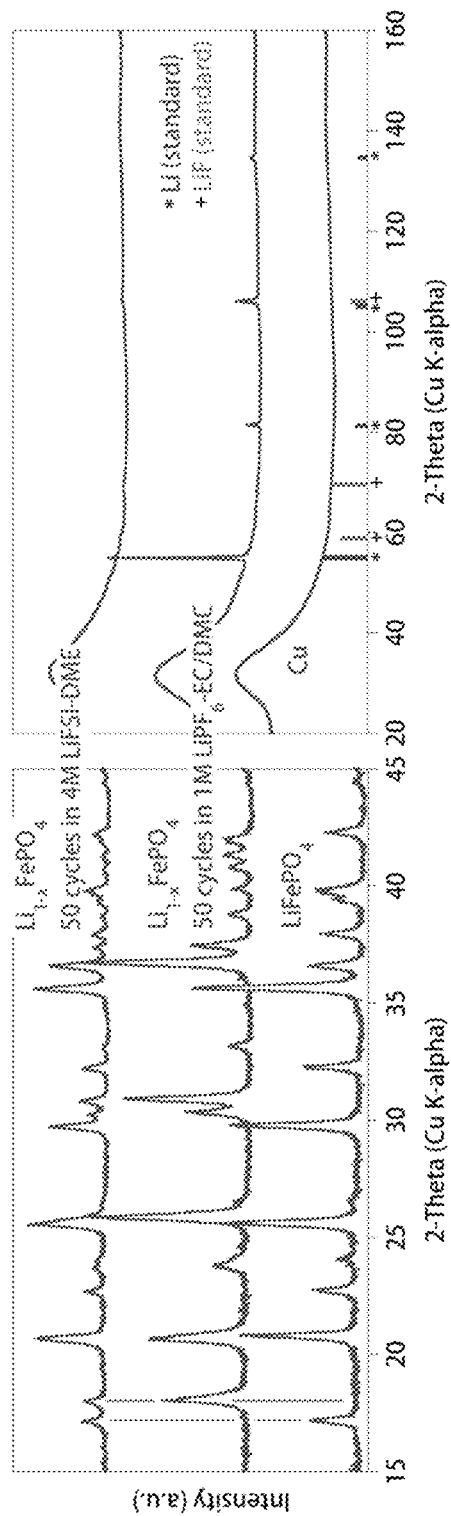
FIG. 5A
FIG. 5B
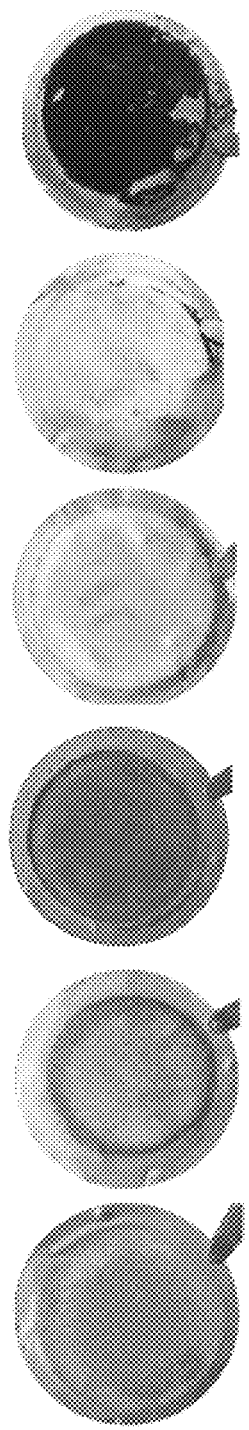
FIG. 6A  FIG. 6B  FIG. 6C  FIG. 6D  FIG. 6E  FIG. 6F

HIGH COULOMBIC EFFICIENCY CYCLING OF METAL BATTERIES

CROSS REFERENCE TO RELATED APPLICATION

This application is a continuation-in-part of U.S. application Ser. No. 14/869,647, filed Sep. 29, 2015, which is continuation-in-part of U.S. application Ser. No. 14/482,312, filed Sep. 10, 2014, each of which is incorporated in its entirety herein by reference.

ACKNOWLEDGMENT OF GOVERNMENT SUPPORT

This invention was made with government support under Contract DE-AC05-76RL01830, awarded by the U.S. Department of Energy. The government has certain rights in the invention.

FIELD

This disclosure concerns embodiments of a method for cycling rechargeable metal batteries with high Coulombic efficiency.

BACKGROUND

Energy storage devices such as batteries with high energy density and power density, long cycle life and calendar life, good safety and low cost are in high demand to supply power for consumer electronic devices, electric vehicles (EVs) and smart grid energy storage. To date, lithium (Li)-ion batteries have been one of the most widely used energy storage systems for portable electronics and EVs. A typical commercial Li-ion battery consists of multiple cell stacks, each composed of an anode current collector/anode/separator/cathode/cathode current collector, soaked with a liquid electrolyte (typically 1 M LiPF$_6$ in a carbonate solvent mixture). Common configurations for Li-ion batteries used in commercial electronics include: Cu/graphite/separator/LiCoO$_2$/Al and Cu/graphite/separator/LiFePO$_4$/Al. During the charge process, Li$^+$ ions extracted from the cathode materials, diffuse through the electrolyte-soaked separator, and then intercalate into the anode material (i.e., graphite). The process is reversed during the discharge process. In these batteries, the usable energy is determined by the identity and amount of active materials present, but the total weight and to a large extent cost are determined by all of the materials, with sizable contributions from the inactive components such as the separator, current collectors, and packaging materials.

Li metal has an extremely high theoretical specific capacity (3860 mAh g$^{-1}$), low density (0.59 g cm$^{-3}$) and the lowest negative electrochemical potential (−3.040 V vs. standard hydrogen electrode); thus rechargeable Li metal batteries have been investigated extensively during the last 40 years (M. S. Whittingham, *Proceedings of the IEEE* 2012, 100, 1518-1534; D. Aurbach and Y. Cohen, *Journal of The Electrochemical Society*, 1996, 143, 3525-3532). Li metal is also the basis for Li-air batteries and Li-sulfur batteries. Unfortunately, rechargeable batteries based on Li metal anode have not yet been commercialized in large scale. There are two main barriers to the development of rechargeable Li metal batteries: one is the growth of Li dendrites during repeated charge/discharge processes, and another is the low Coulombic efficiency (CE) of these processes. These two barriers consequently lead to two critical problems for the Li anode: one is safety hazards because of potential internal short circuits and the high surface area of the active material resulting in high reactivity; another is the short cycle life of such batteries due to low CE of Li cycling. Although low CE can be partially compensated by the inclusion of an excess amount of Li metal, for example, a 300% excess of Li was a common feature in the early development of Li metal batteries—but the dendrite-growth related battery failure (sometimes dramatic failure that leads to fire and/or other hazards), and the emergence of Li-ion batteries have largely diminished industry's efforts devoted to the development of rechargeable Li metal batteries since the early 1990s.

SUMMARY

This disclosure concerns embodiments of a method for charging and discharging a rechargeable alkali metal battery, such as a lithium or sodium metal battery, with high Coulombic efficiency (CE). A rechargeable alkali metal battery, prior to an initial charge cycle, comprises (i) a cathode comprising M$^+$, where M is an alkali metal, (ii) an anode current collector and no anode, or an anode current collector in physical contact with a thin layer of M having an average thickness from 1 μm to 20 μm, (iii) a separator disposed between the anode current collector and the cathode, and (iv) an electrolyte comprising a salt comprising M$^+$ dissolved in a non-aqueous solvent, the electrolyte having a concentration of M$^+$ within a range of 2 M to 8 M. A method for cycling the rechargeable alkali metal battery includes charging the battery at a first current density C1 and discharging the battery at a second current density C2, wherein C2≥2× C1. In some embodiments, C2 is within a range of from 2×C1 to 40×C1. In certain embodiments, C2 is within a range of from 5×C1 to 15×C1 and the rechargeable alkali metal battery has a Coulombic efficiency ≥99.5%. In any or all of the foregoing embodiments, M may be Li or Na.

In any or all of the above embodiments, the rechargeable alkali metal battery, prior to the initial charge cycle, may comprise the thin layer of M on a surface of the anode current collector facing the separator. In some embodiments, the thin layer of M, prior to an initial charge cycle, includes an amount of M that is ≤100 wt % of an amount of M oxidized during a single discharge cycle of the rechargeable alkali metal battery. In an independent embodiment, the rechargeable alkali metal battery, prior to the initial charge cycle, does not comprise the thin layer of M or an anode.

In any or all of the above embodiments, M may be Li and the electrolyte has a Li$^+$ concentration within a range of 2.5 M to 8 M. The electrolyte may comprise lithium bis(fluorosulfonyl)imide (LiFSI) in an ether solvent, e.g., 3-6 M LiFSI in 1,2-dimethoxyethane (DME).

In any or all of the above embodiments, M may be Na and the electrolyte comprises a nonaqueous solvent and sodium bis(fluorosulfonyl)imide (NaFSI) or a sodium salt mixture comprising at least 20 mol % NaFSI based on total sodium salt content. In some embodiments, the electrolyte, when prepared, has a sodium salt concentration of 2.5-5 M, and the nonaqueous solvent is an ether, an organic carbonate, or a mixture thereof. In certain embodiments, the electrolyte consists essentially of (i) NaFSI or a sodium salt mixture consisting of (a) at least 20 mol % NaFSI based on total sodium salt content and (b) NaTFSI, NaPF$_6$, or NaTFSI and NaPF$_6$; and (ii) DME, diglyme, or tetrahydrofuran, wherein the electrolyte, when prepared, has a total sodium salt concentration of 2.5-5 M or a solvent-sodium salt mole ratio from 4:1 to 1:1.

The foregoing and other objects, features, and advantages of the invention will become more apparent from the following detailed description, which proceeds with reference to the accompanying figures.

BRIEF DESCRIPTION OF THE DRAWINGS

FIG. 2A shows charge/discharge voltage profiles for the first three cycles with the two electrolytes; FIG. 2B shows capacity retention and CE of the cells with the two electrolytes as a function of cycle number when charged/discharged at 0.2 mA cm$^{-2}$; FIG. 2C shows capacity retention of the cells with 4 M LiFSI/DME electrolyte charged/discharged at different current densities (open symbols=charge capacity, filled symbols=discharge capacity), where charge current density is the same as the discharge current density.

FIG. 4A shows a Li||LiFePO$_4$ cell cycled with low-rate (C/5) charging (corresponding to Li plating) and high-rate (2C) discharging (corresponding to Li stripping). FIG. 4B shows the CE of Cu||Li cells; capacity of the plated Li metal was 0.5 mAh cm$^{-2}$, which was subsequently stripped at different rates to a cutoff voltage of 1.0 V vs. Li/Li$^+$. FIG. 4C shows charge/discharge voltage profiles for the first 30 cycles of the anode-free cells (Cu||LiFePO$_4$) with 4 M LiFSI-DME cycled at different current densities. FIG. 4D shows discharge capacity and CE of anode-free Cu||LiFePO$_4$ cells charged at 0.2 mA cm$^{-2}$ and discharged at either 0.2 or 2.0 mA cm$^{-2}$ (open symbols-charge capacity, filled symbols-discharge capacity).

FIGS. 5A and 5B show post cycling analyses of the cathodes and Cu current collectors for Cu||LiFePO$_4$ cells. FIG. 5A is XRD patterns of the Li$_{1-x}$FePO$_4$ cathodes after 50 cycles from cells with either 1 M LiPF$_6$-EC/DMC or 4 M LiFSI-DME. FIG. 5B is micro-XRD analysis of the anode residues on the Cu from the same cells. Both the cathodes and Cu current collectors with residues were retrieved from the cells in the fully discharged state. The broad background peak near 32° for the micro-XRD data is due to the glass capillary tubes used for the sample containment. The bottom patterns are for the original cathode and anode current collector.

FIGS. 6A-6C are optical images of lithium deposited on Cu foil in 1 M LiPF$_6$/EC-DMC electrolyte following first cycle plating (6A), first cycle stripping (6B), and 50th cycle stripping (6C).

FIGS. 6D-6F are optical images of lithium deposited on Cu foil in 4 M LiFSI/DME electrolyte following first cycle plating (6D), first cycle stripping (6E), and 50th cycle stripping (6F).

FIG. 7A is a top-view SEM image of the deposited lithium on Cu foil of FIG. 6A. FIGS. 7B and 7C are top view and cross-section SEM images, respectively, of the deposited lithium on Cu foil of FIG. 6C.

FIG. 7D is a top-view SEM image of the deposited lithium on Cu foil of FIG. 6D. FIGS. 7E and 7F are top view and cross-section SEM images, respectively, of the deposited lithium on Cu foil of FIG. 6F.

FIG. 8A shows natural abundance $^6$Li MAS NMR spectra. FIG. 8B shows the corresponding fitting result of the residues (SEI byproducts) formed on the Cu substrate recovered from a cell with 4.0 M LiFSI/DME electrolyte after 50 cycles. $^6$Li NMR spectra of a series of inorganic lithium salts are shown as references.

DETAILED DESCRIPTION

Figure 1B:
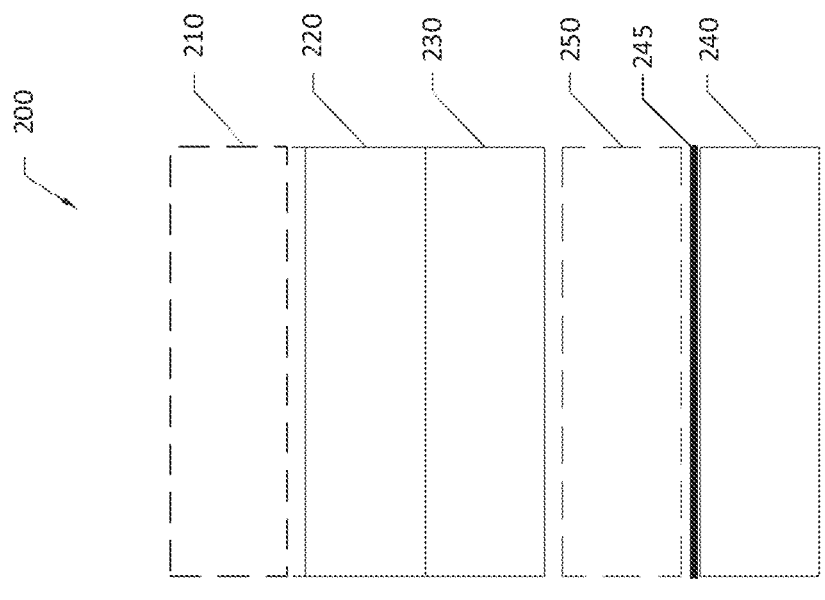
FIG. 1B is a schematic diagram of a rechargeable alkali metal battery, in accordance with one embodiment of the present invention.

This disclosure concerns embodiments of a method for charging and discharging an alkali metal rechargeable battery, such as a lithium or sodium metal battery, with high Coulombic efficiency (CE). The battery may be an anode-free battery. The rechargeable battery has a CE of at least 99%. In some embodiments, the battery has an exceptionally high CE of at least 99.8%. High Coulombic efficiencies are achieved by a combination of a stable, concentrated electrolyte and a charge/discharge protocol which minimizes the corrosion of a Li or Na metal anode, such as an anode deposited during an initial charge cycle of the battery.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

In order to facilitate review of the various embodiments of the disclosure, the following explanations of specific terms are provided:

Anode: An electrode through which electric charge flows into a polarized electrical device. From an electrochemical point of view in a rechargeable battery, positively-charged cations move away from the anode during discharge to balance the electrons leaving via external circuitry. When the battery is recharged, the anode becomes the positive terminal where electrons flow in and metal cations are reduced. For purposes of this disclosure, the term "anode" refers to a solid anode, e.g., an alkali metal or carbon-based anode, and does not refer to components of the electrolyte.

Anode-free: For purposes of this disclosure, the term "anode-free" refers to an initial cell configuration in which an alkali metal or carbon-based anode (e.g., graphite) is not present prior to an initial charge cycle of the battery. Initially, only an anode current collector is present and the anode current collector includes no measurable amount of electrochemically active material. During a first charge cycle, an alkali metal anode is formed in situ on the anode current collector as alkali metal cations are reduced and deposit on the anode current collector. When the battery is fully discharged, the anode current collector includes only an insignificant amount of alkali metal with the majority of the alkali metal having been oxidized to form metal cations that are present in the electrolyte and/or stored in the cathode.

Areal capacity: Capacity per area of anode, typically reported as mAh/cm$^2$.

BOB: bis(oxalato)borate

Cathode: An electrode through which electric charge flows out of a polarized electrical device. From an electrochemical point of view in a rechargeable battery, positively charged cations move toward the cathode during discharge to balance the electrons arriving from external circuitry. When the battery is recharged, the cathode becomes the negative terminal where electrons flow out and metal atoms (or cations) are oxidized.

Cell: As used herein, a cell refers to an electrochemical device used for generating a voltage or current from a chemical reaction, or the reverse in which a chemical reaction is induced by a current. Examples include voltaic cells, electrolytic cells, redox flow cells, and fuel cells, among others. Multiple single cells can form a cell assembly, often termed a stack. A battery includes one or more cells, or even one or more stacks.

Conversion compound: A compound comprising one or more cations, which are displaced by Li or Na when a Li or Na battery is discharged. For example, when iron(II) selenide (FeSe) is used as a cathode material in a Na battery, Fe is replaced by Na during discharge:

$$2Na^+ + 2e^- + FeSe \leftrightarrow Na_2Se + Fe$$

Coulombic efficiency (CE): The efficiency with which charges are transferred in a system facilitating an electrochemical reaction. For a battery, CE may be defined as the amount of charge exiting the battery during the discharge step divided by the amount of charge entering the battery during the charge step. For a half-cell, CE may be defined as the amount of charge exiting the battery during the metal stripping step divided by the amount of charge entering the battery during the metal deposition step. Coulombic efficiency as reported herein refers to the amount of charge passed through cells during Li or Na stripping from an anode current collector divided by the amount of charge passed through cells during Li or Na plating onto the anode current collector.

Current collector: A battery component that conducts the flow of electrons between an electrode and a battery terminal. The current collector may also provide mechanical support for the electrode's active material. The current collector does not include an electrochemically active component.

DFOB: difluoro(oxalate)borate (i.e., $F_2BC_2O_4^-$)

DME: 1,2-dimethoxyethane or monoglyme

Electrochemically active: As used herein, the term "electrochemically active" refers to a component (an element, an ion, or a compound) that significantly contributes to the energy conversions that ultimately enable the battery to deliver/store energy. By "significantly contributes" it is meant that the electrochemically active component contributes at least 10% of the energy conversions that ultimately enable the battery to deliver/store energy. In some embodiments, the electrochemically active component contributes at least 50%, at least 75%, at least 90%, or at least 95% of the energy conversions.

Electrolyte: As used herein, the term "electrolyte" refers to a nonaqueous solution of an alkali metal salt or a mixture of alkali metal salts dissolved in an organic solvent or a mixture of organic solvents.

FSI$^-$: bis(fluorosulfonyl)imide (i.e., $N(SO_2F)_2^-$)

Intercalation: A term referring to the insertion of a material (e.g., an ion or molecule) into the microstructure of another material. For example, Li$^+$ cations can insert, or intercalate, into graphite (C) to form lithiated graphite (LiC$_6$).

Intercalation material: A compound capable of intercalating (inserting) ions reversibly without a significant irreversible change in microstructure. For example, a Li$^+$ cation insertion material is capable of intercalating Li$^+$ cations. One example of a Li$^+$ cation insertion material is graphite, which is often used in Li-ion batteries. Li$^+$ cations intercalate into the carbon structure to form LiC$_6$. Li$^+$ cations can also be extracted from LiC$_6$ to re-form graphite without an irreversible change in the microstructure of graphite.

SEI: Solid-electrolyte interphase. An SEI layer forms when electrolyte components react with lithium metal.

Separator: A battery separator is a porous sheet or film placed between the anode and cathode. It prevents physical contact between the anode and cathode while facilitating ionic transport. In an anode-free battery, the separator is placed between the cathode and the current collector onto which an anode is deposited during an initial charge cycle.

TFSI$^-$: bis(trifluoromethanesulfonyl)imide (i.e., $N(SO_2CF_3)_2^-$)

II. BATTERIES

Embodiments of rechargeable metal batteries with high Coulombic efficiencies are disclosed. The metal may be an alkali metal. In certain embodiments, the metal is lithium or sodium. In one embodiment, the rechargeable battery includes a nonaqueous liquid or polymer electrolyte, an anode current collector and/or an anode comprising a metal, an ion containing compound or compounds—either through intercalation or conversion—as the cathode, and a separator between the cathode and the anode. The electrolyte contains the same active ions as those of the cathode. In certain embodiments, the battery is an anode-free rechargeable metal battery.

A commercial Li-ion or Na-ion battery consists of multiple stacks of anode current collector/anode/separator/cathode/cathode current collector soaked with liquid electrolyte. For example, a common Li-ion battery used in commercial electronics has a structure of Cu/graphite/separator/LiCoO$_2$/Al or Cu/graphite/separator/LiFePO$_4$/Al. The operating principle of these Li-ion batteries can be described as follows. During the charge process, the Li$^+$ ions are extracted out of cathode materials, diffuse through the electrolyte-soaked separator, and then intercalate into the anode materials (i.e., graphite). The process is reversed during the discharge process. In this system, each component adds to the total weight and cost of the system, although the inactive components including the separator, Cu and Al current collectors and packaging materials do not contribute to the usable energy.

Ideally, if alkali metal M$^+$ ions extracted from a cathode can be reversibly deposited onto and stripped from a current collector (e.g., as Li or Na metal), then it is possible to assemble a rechargeable alkali metal battery with a structure of current collector/separator/cathode. Optionally, a cathode current collector also may be present. When initially assembled, this battery contains no active anode material and can be referred to as an anode-free rechargeable battery.

Figure 1A:
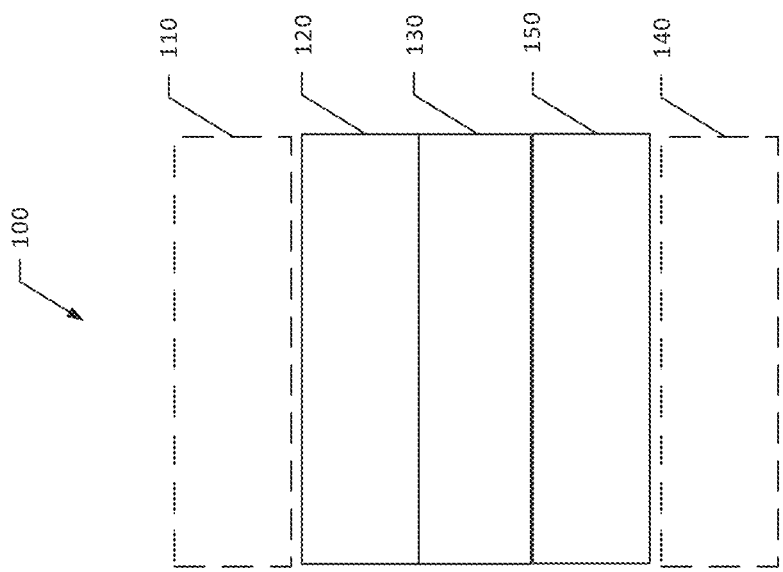
FIG. 1A is a schematic diagram of a conventional rechargeable alkali metal battery including an anode and a cathode.

FIG. 1A is a schematic diagram of one embodiment of a conventional rechargeable alkali metal battery 100 including a cathode 120, a separator 130, which is infused with an electrolyte in some embodiments, and a metal anode 150. In some embodiments, the battery 100 also includes a cathode current collector 110 and/or an anode current collector 140. The cathode current collector 110 and/or anode current collector 140 may be omitted if the corresponding electrode is free-standing, e.g., when the electrode is metal, an intercalation material or a conversion compound deposited on a conductive substrate, or a free-standing film comprising an intercalation material or a conversion compound with conductive additives. By "free-standing" is meant that the film itself has sufficient structural integrity that the film can be positioned in the battery without a support material.

FIG. 1B is a schematic diagram of one embodiment of a rechargeable alkali metal battery 200 as disclosed herein. The battery 200 includes a cathode 220, a separator 230 which, in some embodiments, is infused with an electrolyte, and an anode current collector 240. In some embodiments, the battery 200 also includes a cathode current collector 210.

In an anode-free configuration, a metal anode 250 is formed in situ on the surface of the bare anode current collector 240 facing the separator 230 during an initial charge process. By "bare anode current collector" is meant that the anode current collector, prior to an initial charge process, is not in physical contact with a layer of the alkali metal. By "in situ" is meant that the anode forms during a charging process of the battery. Prior to the initial charge cycle, the anode current collector includes no measurable amount of the alkali metal and no solid anode is present. Instead, the electrolyte and/or cathode serves as the source of the anode material that is formed during the charging process. The anode active material 250 is at least partially consumed during a discharging process of the battery 200. In other words, metal deposited onto the current collector 240 to form an anode 250 during charging is oxidized during discharge to produce metal cations. In some embodiments of an anode-free battery, all or substantially all (e.g., at least 90 wt % or at least 95 wt %) of the anode active material is consumed during the discharging process.

In some embodiments, the anode current collector is metal or another conductive material that will not react with the ions or form an alloy with the ions used in the anode-free battery. The anode current collector may have a geometric surface area slightly less than or equal to the geometric surface area of the cathode. Without wishing to be bound by a particular theory of operation, a smaller surface area may improve homogeneity of a metal layer deposited on the current collector. Exemplary current collector materials include, but are not limited to, copper (Cu), nickel (Ni), iron (Fe), stainless steel, or conductive carbon materials. The current collector may be a foil, a foam, a mesh, or a polymer substrate coated with a conductive material. Advantageously, the anode current collector is stable (i.e., does not corrode or react) when in physical contact with the active metal and the electrolyte in an operating voltage window of the battery.

An anode-free configuration reduces the weight and size of the battery, thereby increasing the energy density compared to a conventional rechargeable battery having a cathode and an anode. For example, in a typical Li-ion battery, the thickness of the graphite anode is about the same as the cathode. The theoretical capacity of Li (3820 mAh cm$^{-2}$) is more than ten times that of graphite (372 mAh cm$^{-2}$). If the graphite anode is eliminated, the thickness of the active materials (cathode/anode) can be reduced to near half that of conventional Li-ion batteries, resulting in a potential energy density (Wh L$^{-1}$) of the anode-free battery increase of more than ~50% relative to conventional Li-ion batteries even when the thickness of other inactive materials are considered. The anode-free configuration also saves the energy and cost associated with the anode production including electrode slurry preparation, slurry coating and drying. Finally, the anode-free design operates as a Li metal battery after the initial charge process, thus providing a higher (approximately 0.1 V) operating voltage and higher energy density (the product of the active material capacity and cell voltage) than for conventional Li-ion batteries. Similar advantages are realized for anode-free sodium batteries.

In certain embodiments, the rechargeable alkali metal battery 200, prior to an initial charge cycle, comprises a thin metal layer 245, such as an alkali metal layer, in physical contact with the anode current collector 240 (FIG. 1B). In this case, the anode current collector may have a geometric surface area slightly larger than or equal to the geometric surface area of the cathode. The metal layer 245 is located on a surface of the anode current collector 240 facing the separator 230. For example, a lithium battery may have a lithium metal layer in physical contact with the anode current collector. A sodium battery may have a sodium metal layer in physical contact with the anode current collector. To increase energy density of the battery and reduce costs, the thin metal layer 245, prior to an initial charge cycle of the battery 200, may have an average thickness from 1-20 μm, such as from 5-20 μm. An anode-free battery, as assembled and prior to an initial cycling process, has a voltage less than 1V, whereas a comparable battery including a thin layer of M, as assembled and prior to an initial cycling process, may have a voltage greater than 1V.

In some embodiments, the battery 200 when initially assembled includes a thin layer 245 of an alkali metal M in physical contact with the anode current collector 240, wherein the thin layer 245 of M includes an amount of M that is ≤100 wt % of an amount of M oxidized during a single complete discharge cycle of the battery, i.e., the amount of M corresponding to the cathode capacity. The weight of M can be calculates as follows: 1 mol of alkaline metal (valence 1) has a capacity of 26.8 Ah. For Li, 1 mol is 6.941 g. Thus, if a cell has a capacity of 1.5 mAh/cm$^2$, for example, its weight is 0.0015/26.8*6.941=0.000388 g/cm$^2$. The density of Li is 0.534 g/cm$^3$, so 0.000388 g Li/cm$^2$ is 0.000388/0.534=0.000728 cm thick Li/cm$^2$ or 7.28 μm thick Li/cm$^2$. Similarly, if a cell has a capacity of 1 mAh/cm$^2$, a layer of Li about 5 μm thick corresponds to the amount of Li oxidized during a single complete discharge cycle. Without wishing to be bound by a particular theory of operation, the thin layer provides excess charge capacity by providing a source of additional alkali metal and prevents all or substantially all (e.g., greater than 90 wt %) of the metal M being stripped from the anode current collector during battery discharge. The thin layer may have a thickness corresponding to 5-100 wt %, 10-100 wt %, 20-100 wt %, 50-100 wt %, or 65-100 wt % of the amount of M oxidized during a single full discharge cycle of the battery. This small amount of M present in the thin metal layer is in stark contrast to conventional rechargeable metal batteries, which have an initial anode thickness sufficient to include a minimum of 400 wt % of the metal (or 300 wt % of excess metal) required for a single discharge cycle of the battery. For example, if a discharge cycle of a conventional lithium battery consumes a layer of metal having a thickness of 5 μm, the anode (prior to an initial charge cycle of the battery) is selected to have a thickness of at least 20 μm, i.e., a 300% of excess Li. Similarly, if a discharge cycle of the conventional battery is expected to consume 15 μm of the anode (e.g., in batteries using a typical cathode having a capacity of 3 mAh/cm$^2$), the starting anode thickness will be at least 60 μm. A thin layer of M advantageously reduces the amount of metal required for the battery and provides increased safety during production, transportation, and/or use of the cells.

In some embodiments, an anode-free battery is assembled in a fully discharged state with the active ions stored in the cathode and the electrolyte. During the initial charge process, alkali metal ions are extracted from the cathode and deposited on the anode current collector as alkali metal. During the discharge process, metal deposited on the anode current collector will serve as the ion source for the intercalation or conversion process of the cathode electrode. The electrolyte can form a stable solid electrolyte interphase (SEI) layer to minimize the reaction and consumption of selected ions during charge/discharge processes of the battery, especially during a charge process when metal is deposited on the negative current collector or negative electrode.

The positive electrode, or cathode, may be a free-standing film including a conductive additive or deposited on a conductive substrate (e.g., a cathode current collector) which is stable with the electrolyte within the operation voltage window of the battery. In some embodiments, the rechargeable battery is a lithium metal battery. The cathode of the rechargeable lithium battery may comprise a lithium transition metal oxide such as $LiCoO_2$, $LiMn_2O_4$, $LiNiO_2$, $LiNi_{1/3}Co_{1/3}Mn_{1/3}O_2$, or a lithium transition metal phosphate such as $LiFePO_4$ or $LiMnPO_4$. Other cathode materials can include, but are not limited to, $Li_{4-x}M_xTi_5O_{12}$ (M=Mg, Al, Ba, Sr, or Ta; 0≤x≤1), $MnO_2$, $Li_3V_2O_5$, $LiV_3O_8$, $LiM^{C1}{}_xM^{C2}{}_{1-x}PO_4$ ($M^{M1}$ or $M^{C2}$=Fe, Mn, Ni, Co, Cr, or Ti; 0≤x≤1), $Li_3V_{2-x}M_x(PO_4)_3$ (M=Cr, Co, Fe, Mg, Y, Ti, Nb, or Ce; 0≤x≤1), $LiVPO_4F$, $LiM^{C1}{}_xM^{C2}{}_{1-x}O_2$ (($M^{C1}$ or $M^{C2}$=Fe, Mn, Ni, Co, Cr, Ti, Mg, Al; 0≤x≤1), $LiM^{C1}{}_xM^{C2}{}_yM^{C3}{}_{1-x-y}O_2$ (($M^{C1}$, $M^{C2}$, or $M^{C3}$=Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y<0.5), $xLi_2MnO_3.(1-x)LiM^{C1}{}_xM^{C2}{}_yM^{C3}{}_{1-y-z}O_2$ ($M^{C1}$, $M^{C2}$, or $M^{C3}$=Mn, Ni, Co, Cr, Fe, or mixture of; x=0.3-0.5; y≤0.5; z≤0.5), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ (0≤y≤1). Further cathode materials may include Li-containing compounds which can react with Li through conversion reactions during the charge/discharge process. Examples of the conversion compounds include $Li_2O$, $Li_2O_2$, $LiO_2$, $Li_2S$, $FeF_3$, $AgCl$, $CuCl_2$, $NiF_2$, $LiF$, $TiF_3$, $VF_3$, $MnF_2$, $MnF_3$, $FeF_2$, $FeF_3$, $CoF_2$, $CoF_3$, $NiF_2$, $CuF_2$, $ZnF_2$, $SnF_2$, $AgF$, $TiO$, $VO$, $V_2O_3$, $V_2O_5$, $V_6O_{13}$, $Cr_2O_3$, $Cr_3O_4$ etc. The typical conversion reaction can be expressed as:

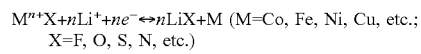
$M^{n+}X+nLi^+ +ne^- \leftrightarrow nLiX+M$ (M=Co, Fe, Ni, Cu, etc.; X=F, O, S, N, etc.)

The cathode can be either prepared as a free-standing film with conductive additives or deposited on a conductive substrate which is stable with the electrolyte within the operation voltage window of the battery.

In some embodiments, the rechargeable battery is a sodium metal battery. The cathode of the sodium battery is a nonaqueous cathode comprising a Na-containing compound (such as an intercalation or conversion compound), oxygen, or sulfur. The sodium intercalation compound may be a sodium transition metal oxide or sodium transition metal phosphate. Exemplary intercalation compounds include, but are not limited to, $NaFePO_4$, $Na_2FePO_4F$, $Na_2FeP_2O_7$, $Na_3V_2(PO_4)_3$, $Na_3V_2(PO_4)_2F_3$, $NaVPO_4F$, $NaVPOPOF$, $Na_{1.5}VOPO_4F_{0.5}$, $NaCo_2O_4$, $Na_2Ti_3O_7$, and $Na_xMO_2$ where 0.4<x≤1, and M is a transition metal or a mixture of transition metals (e.g., $NaCrO_2$, $NaCoO_2$, $NaCoO_2$ (0.4≤x≤0.9), $Na_{2/3}Ni_{1/3}Mn_{2/3}O_2$, $Na_{2/3}Fe_{1/2}Mn_{1/2}O_2$, $NaNi_{1/3}Fe_{1/3}Mn_{1/3}O_2$, $NaNi_{1/3}Fe_{1/3}Co_{1/3}O_2$, $NaNi_{1/2}Mn_{1/2}O_2$), Prussian blue analogue (PBA) cathodes, viz., $Na_xM_y[Fe(CN)_6]_z.nH_2O$, for which M is either Mn or Fe bridged by C≡N ligands to form an open framework suitable for intercalation of sodium ions. Other sodium intercalation materials include $Na_4Ti_5O_{12}$, $Fe_3O_4$, $TiO_2$, $Sb_2O_4$, Sb/C composite, SnSb/C composite, amorphous P/C composite, and combinations thereof. In an independent embodiment, the anode is a sodium conversion compound in which sodium displaces another cation, such as FeSe, $CuWO_4$, CuS, CuO, CuCl, or $CuCl_2$.

The negative current collector can be a metal or another conductive material such as, but not limited to, Cu, Ni, Fe, or conductive carbon materials. The separator can be a porous polymer film such as a polyethylene or polypropylene-based materials with or without ceramic coatings or composites.

The anode-free rechargeable battery improves the energy density of Li- or Na-based batteries. Since the anode can be eliminated from the battery structure, the battery weight and volume can be reduced and the energy density of the battery can be largely increased. The anode-free battery also allows a minimal loss of the active ions, such as lithium or sodium ions, used for battery operation. The battery, optionally including the thin alkali metal (Li or Na) layer, includes a liquid or polymer electrolyte and demonstrates very high Coulombic efficiencies, even larger than 95%, with no battery failure related to dendrite growth when used with a concentrated electrolyte as disclosed herein. In some embodiments, the Coulombic efficiency (CE) is greater than 99.1% when the battery includes a concentrated electrolyte as disclosed herein and is cycled according to the methods disclosed herein. In certain embodiments, the CE is at least 99.5%, at least 99.7%, or at least 99.8%.

A highly stable electrolyte and a stable anode current collector allow for the practical application of the anode-free rechargeable battery and the rechargeable battery including an initial thin layer of M as disclosed herein. The highly stable electrolytes have only negligible reactions with the lithium or sodium metal, and the electrolytes can prevent dendrite growth during the cycling process. The anode current collector has negligible reaction with the lithium or sodium at the operating temperature range of batteries

III. ELECTROLYTES

In some embodiments, the battery is a lithium battery, and the electrolyte comprises, consists essentially of, or consists of a lithium salt, such as LiFSI, LiAsF$_6$, LiCF$_3$SO$_3$, LiTFSI, LiBOB, LiDFOB, LiClO$_4$, LiBF$_4$, or a mixture thereof, dissolved in a solvent, an ether, a non-aqueous solvent, or solvent mixture, such as DME, diglyme, triglyme, tetraglyme, diethyl ether, 1,3-dioxolane, 1,4-dioxane, tetrahydrofuran, 2,5-dimethyltetrahydrofuran, ethylene carbonate, propylene carbonate, dimethyl carbonate, ethyl methyl carbonate, diethyl carbonate, vinylene carbonate, fluoroethylene carbonate, vinyl ethylene carbonate, trimethyl phosphate, triethyl phosphate, triphenyl phosphate, tris(2,2,2-trifluoroethyl)phosphate, tris(2,2,2-trifluoroethyl)phosphite, dimethyl sulfone, ethyl methyl sulfone, sulfolane, sulfoxide, acetonitrile, propionitrile, butyronitrile, or a mixture thereof. The term "consists essentially of" also means that the electrolyte may include other non-electrochemically active components, such as additives, that do not affect battery performance. Typical additives that do not affect the battery performance may include nonmetal halide salts, such as ammonium chloride (NH$_4$Cl) or tetraethylammonium chloride (Et$_4$NCl).

The concentration of lithium salt in the electrolyte is within a range of from 1.1 M to 8 M, such as 2.5-8 M, 3-8 M, or 3-6 M. Desirably, the selected electrolyte can form a stable SEI layer to minimize the side reactions between the electrolyte and in situ formed Li metal which largely reduces the consumption of active materials, solvent and salt during the charge/discharge processes of the batteries. In some examples, the electrolyte comprises 3 M to 6 M LiFSI in 1,2-dimethoxyethane (DME).

In some embodiments, the battery is a sodium battery, and the electrolyte comprises, consists essentially of, or consists of a sodium salt or mixture of sodium salts dissolved in a nonaqueous solvent, i.e., an organic solvent or a mixture of organic solvents. As used herein, the term "consist essentially of" means that the electrolyte does not include any electrochemically active component other than the sodium salt, and that the electrolyte includes no more than trace amounts (<100 ppm) of water. The term "consists essentially of" also means that the electrolyte may include other non-electrochemically active components, such as additives, that do not affect battery performance. Typical additives that do not affect the battery performance may include nonmetal halide salts, such as ammonium chloride (NH$_4$Cl) or tetraethylammonium chloride (Et$_4$NCl).

In some embodiments, the organic solvent is an ether, an organic carbonate, or any combination thereof. Exemplary organic solvents include, but are not limited to, 1,2-dimethoxyethane (DME), diglyme (DG), triglyme, tetraglyme, diethyl ether, 1,3-dioxolane, 1,4-dioxane, tetrahydrofuran (THF), 2,5-dimethyltetrahydrofuran, ethylene carbonate, propylene carbonate (PC), dimethyl carbonate, ethyl methyl carbonate, diethyl carbonate, vinylene carbonate, fluoroethylene carbonate, vinyl ethylene carbonate, or a mixture thereof. In some embodiments, the organic solvent is DME, DG, THF, or a mixture thereof. In an independent embodiment, the organic solvent is DME.

Suitable sodium salts of the nonaqueous electrolyte are salts that are soluble in the organic solvent at a concentration of at least 2.5 M or at a solvent-salt mole ratio less than or equal to 4:1. The sodium salt can be an inorganic salt, an organic salt, or any mixture thereof. The sodium salt may be partially or fully dissociated into its ions in the electrolyte. Exemplary sodium salts include, but are not limited to, sodium bis(fluorosulfonyl)imide (NaN(SO$_2$F)$_2$, NaFSI), sodium hexafluoroarsenate (NaAsF$_6$), sodium hexafluorophosphate (NaPF$_6$), sodium trifluoromethanesulfonate (NaCF$_3$SO$_3$), sodium bis(perfluoroethanesulfonyl)imide (NaN(SO$_2$C$_2$F$_5$)$_2$, NaBETI), sodium bis(trifluoromethanesulfonyl)imide (NaN(SO$_2$CF$_3$)$_2$, NaTFSI), sodium bis(oxalato)borate (NaBOB), sodium difluoro(oxalato)borate (NaDFOB), sodium perchlorate (NaClO$_4$), sodium tetrafluoroborate (NaBF$_4$), sodium tris(pentafluoroethyl)trifluorophosphate (Na[(C$_2$F$_5$)$_3$PF$_3$], NaFAP), and mixtures thereof. In certain embodiments, the sodium salt comprises, consists essentially of, or consists of NaFSI.

In some embodiments, the nonaqueous electrolyte includes a combination of sodium salts, wherein one of the salts is NaFSI. NaFSI may provide at least 20 mol %, at least 40 mol %, at least 60 mol %, or at least 80 mol % of the sodium salt in the electrolyte. In one embodiment, the electrolyte includes a mixture of NaFSI and NaTFSI. In an independent embodiment, the electrolyte includes a mixture of NaFSI and NaPF$_6$.

Embodiments of the disclosed nonaqueous electrolytes include a high concentration of the sodium salt (i.e., the electrolyte is prepared with a sodium salt concentration of at least 2.5 M or the electrolyte is prepared with a solvent-sodium salt mole ratio less than or equal to 4:1. In some embodiments, the nonaqueous electrolyte, when prepared, has a Na$^+$ cation concentration of at least 2.5 M or a solvent-NW cation mole ratio less than or equal to 4:1. In certain embodiments, the electrolyte is prepared with a sodium salt concentration, or Na cation concentration, within a range of from 2.5 M to saturation, such as at least 2.5 M, at least 3 M, from 2.5-8 M, from 2.5-5 M, or from 3-5 M. In one embodiment, the sodium salt concentration is from 3-4 M. Alternatively, the sodium salt concentration may be expressed as a solvent-sodium salt mole ratio, or a solvent-Na$^+$ cation mole ratio, wherein the mole ratio when the electrolyte is prepared is less than or equal to 4:1 (4 moles solvent, 1 mole sodium salt (or Na$^+$ cations)), ≤3:1, ≤2:1, or ≤1.5:1, such as a solvent to salt mole ratio from 4:1 to 1:1, from 3:1 to 1:1, or from 2:1 to 1:1. In one embodiment, the solvent-sodium salt mole ratio is 2:1.

In some embodiments, the nonaqueous electrolyte comprises, consists essentially of, or consists of (i) NaFSI or a sodium salt mixture consisting of at least 20 mol % NaFSI based on total sodium salt content, (ii) DME, DG, or THF, wherein the electrolyte, when prepared, has a total sodium salt concentration of 3-5 M or a solvent-sodium salt mole ratio from 4:1 to 1:1. For example, the electrolyte may comprise, consist essentially of, or consist of DME and NaFSI, DG and NaFSI, or THF and NaFSI. In certain embodiments, the electrolyte consists essentially of or consists of DME-NaFSI, DME-NaFSI-NaTFSI including at least 20 mol % NaFSI based on total sodium salt content, DME-NaFSI-NaPF$_6$ including at least 20 mol % NaFSI based on total sodium salt, DG-NaFSI, or THF-NaFSI. Exemplary nonaqueous electrolytes include 3-5 M NaFSI in DME, DME-NaFSI with a solvent-sodium salt mole ratio from 4:1 to 1:1, DME-NaFSI-NaTFSI with a solvent-sodium salt mole ratio from 4:1 to 1:1 and including 20-80 mol % NaFSI based on total sodium salt content, DME-NaFSI-NaPF$_6$ with a solvent-sodium salt mole ratio from 4:1 to 1:1 and including 20-80 mol % NaFSI based on total sodium salt content, DG-NaFSI with a solvent-sodium salt mole ratio from 4:1 to 1:1, and THF-NaFSI with a solvent-sodium salt mole ratio from 4:1 to 1:1. In certain embodiments, the electrolyte consists essentially of 3-5 M NaFSI in DME, DME-NaFSI with a solvent-sodium salt mole ratio of 3:1 to 1:1, DME-NaFSI-NaTFSI with a solvent-sodium salt mole ratio of 2:1 and including 20-80 mol % NaFSI based on total sodium salt content, DME-NaFSI-NaPF$_6$ with a solvent-sodium salt mole ratio of 2:1 and including 60-80 mol % NaFSI based on total sodium salt content, DG-NaFSI with a solvent-sodium salt mole ratio of 2:1 to 1:1, or THF-NaFSI with a solvent-sodium salt mole ratio from 4:1 to 1:1.

Some embodiments of the disclosed nonaqueous electrolytes can form a stable solid electrolyte interphase (SEI) layer to minimize the reaction and consumption of selected ions during the charge/discharge processes of batteries, especially during a charge process when metal is deposited on the anode current collector or anode electrode.

IV. METHODS OF CYCLING THE BATTERY

During an initial charge cycle of an anode-free alkali metal battery, alkali metal M$^+$ ions are extracted from the cathode and transported towards the anode current collector where they are electrodeposited as M. During the subsequent discharge process, M will be stripped from the anode as M$^+$ ions and intercalated back into the cathode. Traditionally, this battery configuration was considered to be unworkable. In addition to the concern of dendritic growth on the anode, resulting in dendrite penetration through the separator and shorting of the cell, another concern related to the anode-free battery structure is that use of Li or Na metal is problematic due to their high reactivities and typically very low plating/stripping efficiency of the metal—usually less than 80% in most non-aqueous electrolytes. As a consequence, the in-situ plated M supplied by the cathode electrode will be completely consumed within a few cycles. Low Coulombic efficiency (CE) and/or dendrite formation have prevented practical application of rechargeable anode-free alkali metal batteries.

Table 1 shows the projected cycle life of an anode-free battery as a function of Li cycling CE. The data assumes that (i) the cathode of the battery has no degradation, and (ii) the battery failure occurs if the battery capacity drops below 80% of the original value. At a CE of 99%, the battery has a lifetime of only 22 cycles. From a practical standpoint, an anode-free rechargeable battery should have a significant lifetime, such as a lifetime of at least 100 cycles. For a rechargeable battery to withstand extensive cycling (e.g., more than 100 cycles), a CE of at least 99.8% is required. Further increases in the CE produce a dramatic boost in the battery's life.

TABLE 1

| CE required to retain more than 80% of the battery capacity. ||
| --- | --- |
| CE (%) | Cycles to maintain a capacity > 80% of initial value |
| 99 | 22 |
| 99.1 | 25 |
| 99.7 | 74 |
| 99.8 | 112 |
| 99.9 | 223 |
| 99.99 | 2231 |

It is very difficult to increase CE above 99%. However, for commercially practical applications, it is critical to achieve a CE of at least 99.8% so that the battery has a lifetime of greater than 100 cycles. As can be seen in Table 1, the number of cycles increases in a nonlinear manner as CE is increased. Increasing CE from 99 to 99.1% provides only three additional cycles, while increasing CE from 99.1 to 99.7 raises the lifetime from 25 to 74 cycles. Further increasing CE by just 0.1%, i.e., from 99.7% to 99.8%, increases the lifetime to more than 100 cycles. Another 0.1% increase provides a lifetime of more than 220 cycles, while a CE of 99.99% would provide a lifetime of more than 2,200 cycles. Thus, a need exists for rechargeable alkali metal batteries having a CE of at least 99.8%.

Embodiments of the disclosed concentrated electrolytes enable cycling of a rechargeable alkali metal battery with a CE>80% without detrimental dendrite growth. In one embodiment, a CE of 99% was obtained with an anode-free sodium battery including a concentrated electrolyte as disclosed herein. In an independent embodiment, a CE up to 99.1% was obtained with an anode-free lithium battery including a concentrated electrolyte as disclosed herein. However, a CE of 99.1% still provides a lifetime of only 25 cycles.

The inventors surprisingly discovered that CE can be increased above 99.1% by (i) utilizing a stable concentrated electrolyte as disclosed herein, and (ii) cycling the battery using a slow charge/rapid discharge protocol wherein the battery is charged at a first current density C1 and discharged at a second, higher current density C2, i.e., C2>C1. In some embodiments, C2≥2×C1, such as ≥5×C1 or ≥10×C1. For instance, if C1=0.2C (where 1C is the capacity of the battery, and the charge cycle would be 5 hours), then C2 may be 2C. C2 may be within a range of from 2×C1 to 40×C1, such as from 5×C1 to 40×C1, from 5×C1 to 20×C1, from 5×C1 to 15×C1, or from 10×C1 to 15×C1. In some examples, C2 is 10×C1.

Notably, the slow charge/rapid discharge protocol alone (i.e., without a highly concentrated electrolyte) does not provide a CE high enough for practical use. As previously reported in Li metal batteries with a structure of Li/LiNi$_{1/3}$Mn$_{1/3}$Co$_{1/3}$O$_2$ (NMC) cathode using an electrolyte of 1 M LiPF$_6$-EC/DMC (1/2 v/v), charging the cells slowly and discharging at a higher rate improved the cycle life of the Li metal batteries relative to the cells cycled in other conditions such as those charged and discharged at the same rate (Zheng et al., *Adv. Energy Mater.* 2016, 1502151). However, the CE of the Li/LiNi$_{1/3}$Mn$_{1/3}$Co$_{1/3}$O$_2$ cells was still low (~80%).

In some embodiments, an anode-free rechargeable alkali metal battery including a concentrated electrolyte as disclosed herein and cycled using a protocol where C2≥5×C1 has an average CE≥99.5%, ≥99.6%, ≥99.7% or even ≥99.8% during cycling. Thus, the CE may be 99.5-100%, 99.6-100%, 99.7-100%, or 99.8-100%.

Addition of a thin layer of M in physical contact with the anode current collector, prior to an initial charge cycle of the battery, further increases the CE, reduces capacity fade by providing a source of excess Li at the anode current collector, and/or provides a stable voltage-reference during the cycling of batteries, especially at the end of the discharge process. In certain embodiments, the battery includes a thin metal layer in physical contact with the anode current collector, and the CE is near 100%, e.g., greater than or equal to 99.9%, such as 99.9-100%. Advantageously, the thin metal layer increases CE without significantly increasing battery weight and thereby reducing energy density.

Without wishing to be bound by a particular theory of operation, it is believed that the slow charge/fast discharge protocol increases CE by stabilizing the in-situ formed M due to minimized reactions between M and the concentrated electrolyte, and/or by reducing corrosion of the deposited metal anode. By depositing the metal M at low current density, a large nodule of M with limited surface area forms, which in turn limits reactivity between M and the electrolyte. Stripping M at high rates produces a higher local concentration of $M^+$ at the surface of M, thereby acting as a barrier to minimize reaction of freshly exposed M with free solvent molecules and reducing corrosion. In some embodiments, the CE and/or discharge capacity is stabilized in ≤10 cycles. In certain embodiments, the CE and/or discharge capacity is stabilized in ≤3 cycles. Additionally, embodiments of the disclosed cycling protocol also lead to more compact and/or more conduct SEI layers (see, e.g., Example 3).

In some embodiments, the battery is an anode-free battery or a battery including a thin layer of M in physical contact with the anode current collector, and the battery is charged at a current density C1 of ≤0.7 mA/cm², such as at a current density from 0.1 mA/cm² to 0.7 mA/cm², and discharged at a current density C2, where C2≥2×C1, such as ≥5×C1, e.g., a discharge current density of from 1.5 mA/cm² to 4 mA/cm². In certain examples, the battery is charged at a current density of C/5 and discharged at a current density of 2C. For instance, a battery having a capacity of 1 mA may be charged at a current density of 0.2 mA/cm² and discharged at a current density of 2 mA/cm².

Embodiments of the disclosed slow charge/rapid discharge protocol are useful with anode-free rechargeable alkali metal batteries having a bare anode current collector prior to an initial charge cycle, and with rechargeable alkali metal batteries including a thin layer (e.g., 1-20 μm) of M in physical contact with the anode current collector prior to the initial charge cycle. In certain embodiments, a rechargeable anode-free lithium or sodium metal battery including a concentrated electrolyte as disclosed herein and cycled using a slow charge/rapid discharge protocol as disclosed herein delivers an initial discharge capacity close to the nominal capacity of the cathode and an average CE at least 99.8% during cycling. Inclusion of an initial thin layer of M may further increase CE to near 100%, providing a battery lifetime of more than 100 cycles, more than 200 cycles, more than 500 cycles, or even more than 1,000 cycles with little or no decrease in capacity and/or CE (see, e.g., Example 2, FIG. 4B).

V. EXAMPLES

The following examples serve to illustrate embodiments and aspects of the present invention and are not to be construed as limiting the scope thereof.

Electrochemical Measurements.

Anode-free Li rechargeable cells (Cu∥LiFePO$_4$) were evaluated using CR2032 coin-type cells. These were assembled using a bare Cu foil as the anode substrate (current collector), LiFePO$_4$ coated on Al foil as the cathode, one layer of Celgard 2045 (porous polyethylene membrane) as the separator, and either 1 M LiPF$_6$-EC/DMC (1/2 v/v) or 4 M LiFSI-DME as the liquid electrolyte. Battery grade DME was obtained from BASF Corporation. LiFSI was obtained from Nippon Shokubai and was dried for three days under vacuum at 100° C. before use. The 4 M LiFSI-DME electrolyte was prepared by dissolving the desired amount of salt into the solvent in an MBraun LABmaster glove box with an Ar atmosphere (<1 ppm O$_2$ and <1 ppm H$_2$O). The standard LiFePO$_4$ electrode laminate was provided by A123 Systems (Waltham, Mass.) with a nominal areal capacity of 1.6 mAh cm$^{-2}$. The Cu foil substrate was washed by immersing it in 1 M HCl for 10 min., followed by rinsing with distilled water and acetone three times and then rapid drying under vacuum. All of the cell assembly/disassembly was carried out in an Ar-filled glove box. The cells were cycled between 3.0-3.8 V vs. Li/Li$^+$ at current densities ranging from 0.2-2.0 mA cm$^{-2}$ using a Lanhe battery testing station and a temperature control chamber set to 30° C. The Culp coin cells were assembled using Li foil (250 μm thick, MTI Corporation) as the counter/reference electrode, one piece of Celgard 2045 as the separator with 75 μL of electrolyte added, and Cu foil (All Foils) served as the substrate for Li metal plating. The active surface area of the Cu foil disks for Li deposition was 2.11 cm$^2$. During each cycle, a capacity cut-off of 0.5 mAh cm$^{-2}$ was used for plating and a voltage cut-off of 1.0 V (vs. Li/Li$^+$) was applied for stripping. Li∥LiFePO$_4$ coin cells were also assembled using Li foil (250 μm thick, MTI Corporation) as the negative electrode, one piece of polyethylene membrane (Celgard 2045) as the separator with 75 μL of electrolyte added. Disks of the LiFePO$_4$ coated on Al foil were punched with a surface area of 1.27 cm$^2$ to serve as the positive electrode. Cells of this configuration were cycled by charging at 0.33 mA cm$^{-2}$ to 3.8 V and discharging at 3.3 mA cm$^{-2}$ to 3.0 V. Electrochemical impedance spectroscopy (EIS) of the cells was measured for fully discharged cells at different stages of the cycling at a frequency range from 100,000 to 0.01 Hz with perturbation amplitude of ±10 mV using a Solartron 1287 electrochemical interface coupled with a 1255 Frequency Response Analyzer.

Characterization.

X-ray diffraction (XRD) of the cycled cathode (Li$_{1-x}$FePO$_4$) and anode residues on the Cu substrates recovered from the anode-free cells with the different electrolytes after 50 cycles were carried out using a D8 Advance X-ray diffractometer (Bruker AXS, Inc.) equipped with a Cu Kα source (λ=1.5418 Å). The samples were placed in an airtight silicon crystal specimen holder (Bruker AXS, Inc.) to avoid air/moisture contamination during sample transfer for the measurements. Samples for the micro-XRD analyses were sealed under Ar in thin-walled glass capillary tubes and diffraction patterns were recorded with a Rigaku D/Max Rapid II instrument using Cr Kα radiation (λ=2.2910 Å). The morphology studies of the Li plated on the Cu substrates and the residues on the Cu substrates after cycling (retrieved from the fully discharged cells) were performed by scanning electron microscopy (SEM) on an FEI Quanta 650 ESEM at 5.0 kV and 0.17 nA.

Example 1

Conventional Charge/Discharge of Anode-Free Lithium Batteries

Figure 2A:
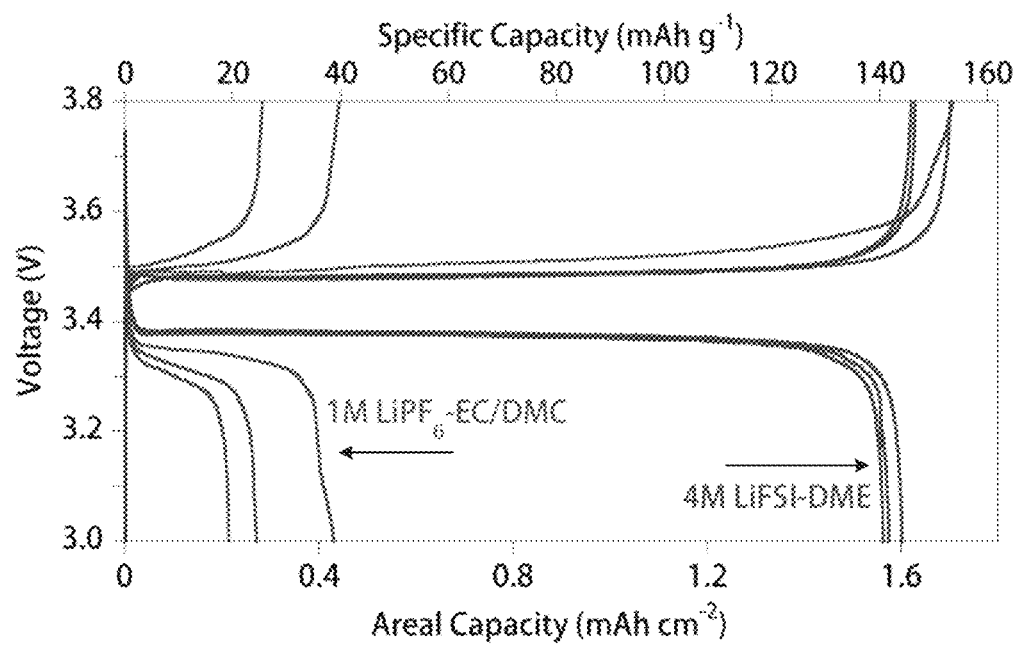
FIGS. 2A-2C compare electrochemical performances of anode-free Cu||LiFePO$_4$ cells with either 1 M LiPF$_6$/EC-DMC or 4 M LiFSI/DME.

Cu‖LiFePO$_4$ coin-type cells were assembled using a Cu anode current collector, and a LiFePO$_4$ electrode with a nominal areal capacity of 1.6 mAh cm$^{-2}$ as the cathode. The curves in FIG. 2A represent the voltage profiles of the cells using a conventional carbonate-based electrolyte (1 M LiPF$_6$-EC/DMC (1/2 v/v)) and a highly concentrated ether-based electrolyte 4 M LiFSI-DME) as disclosed herein. For both electrolytes, the Cu‖LiFePO$_4$ cells had an initial charge (Li-deposition on Cu) capacity of ~1.71 mAh cm$^{-2}$ (FIG. 2A), corresponding to a specific capacity of 148 mAh g$^{-1}$ (the theoretical capacity of a LiFePO$_4$ cathode is (170 mAh g$^{-1}$). This indicated that the extent of the Li$^+$ ion extraction from the LiFePO$_4$ cathode (converting its composition to Li$_{1-x}$FePO$_4$) during the initial charge process was equivalent regardless of the electrolyte composition.

Figure 2C:
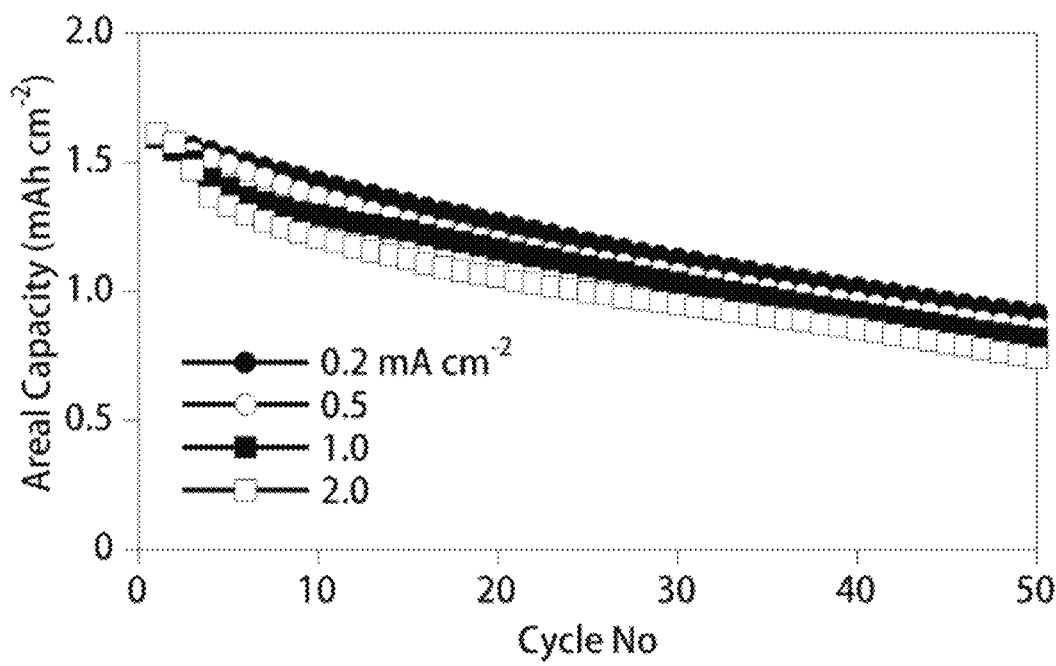
Figure 2B:
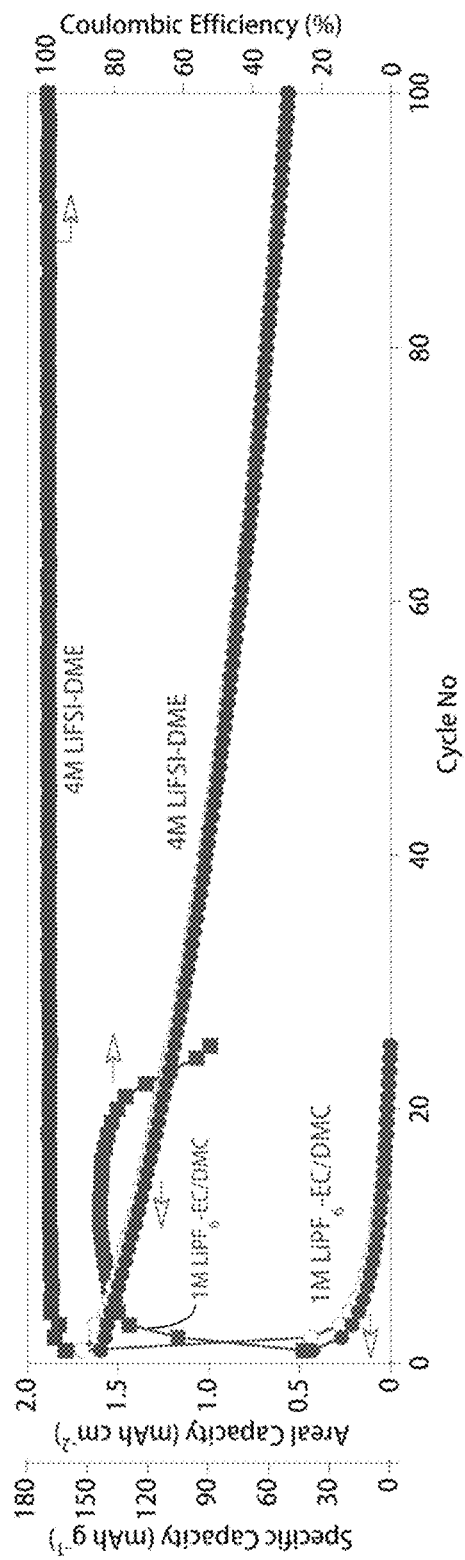
Figure 3:
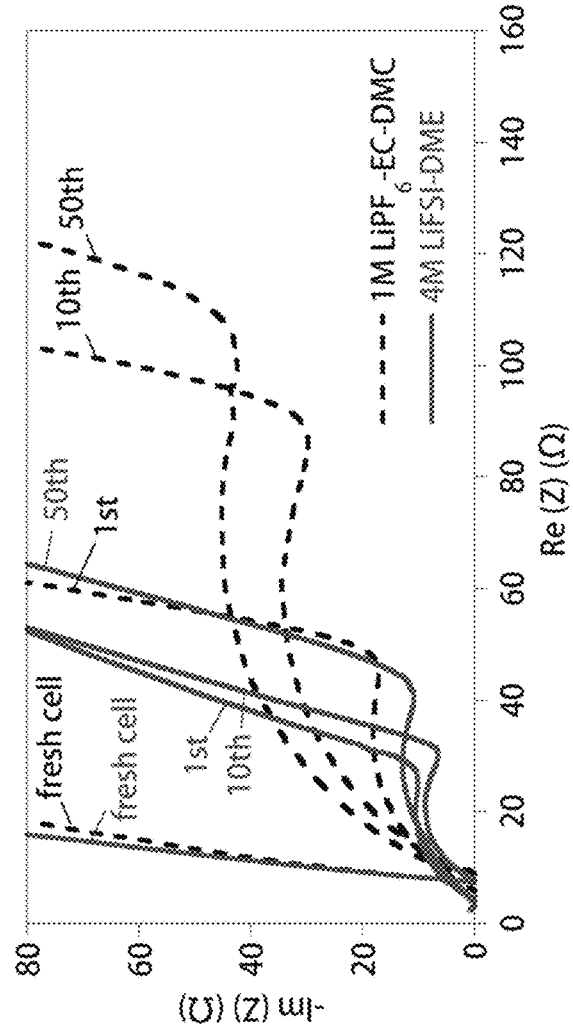
FIG. 3 shows Nyquist plots of anode-free Cu||LiFePO$_4$ cells with either 1 M LiPF$_6$/EC-DMC (dashed lines) or 4 M LiFSI/DME (solid lines) after different cycles when charged and discharged at 0.2 mA cm$^{-2}$. All data were collected at the discharged state of the cells.

However, for the cell with the carbonate-based electrolyte, the subsequent discharge process only recovered ~25% of the total plated Li, which was re-intercalated into the Li$_{1-x}$FePO$_4$ cathode. This tremendous capacity loss is attributed to both the degradation of the active Li material and the resultant formation of a high impedance interphasial layer on Li metal surface when the deposited Li extensively reacts with the carbonate solvents and LiPF$_6$ (Woo et al., *J. Electrochem. Soc.* 2014, 161:A827-A830). For Li plating in carbonate electrolytes, the plated Li typically grows into dendritic or mossy structures, with a large surface-to-volume ratio (Lopez et al., *J. Electrochem. Soc.* 2009, 156: A726-A729). During the stripping process, the Li metal encased within a solid electrolyte interphase (SEI) layer becomes electrically isolated and thus electrochemically inactive, i.e., "dead Li", which is inaccessible for the subsequent plating/stripping processes (Steiger et al., *Electrochim. Acta* 2014, 136:529-536). This leads to the quick escalation of cell impedance (FIG. 3) and total failure of the cell after only limited cycling (FIG. 2B). The curves in FIGS. 2B and 3 represent the performance of the cells using a conventional carbonate-based electrolyte (1 M LiPF$_6$-EC/DMC (1/2 v/v)) and a highly concentrated ether-based electrolyte 4 M LiFSI-DME).

In contrast, the Cu‖LiFePO$_4$ cell with the highly concentrated ether-based electrolyte (4 M LiFSI-DME) had initial charge and discharge capacities of 148 and 143 mAh g$^{-1}$, respectively, providing a high initial CE of 96.6%. This highly reversible capacity remained stable without significant capacity degradation during the first three cycles (FIG. 2A), suggesting that the active Li was not consumed during the Li plating/stripping processes. The superior stability of Li in the anode-free cell using the 4 M LiFSI-DME electrolyte was further evidenced by the significantly enhanced capacity retention and higher CE during long-term cycling (FIG. 2B). Moreover, a very limited cell impedance increase occurred during cycling of the cell with the 4 M LiFSI-DME electrolyte (FIG. 3). Notably, the anode-free cell with the 4 M LiFSI-DME electrolyte retained a capacity of 85 mAh g$^{-1}$ after 50 cycles (ca. 60% capacity retention), with an average CE>99%.

Even more remarkably, the charge/discharge performance at different current densities demonstrated that the anode-free Cu‖LiFePO$_4$ cell with 4 M LiFSI/DME electrolyte could be discharged at a rate of 2.0 mA cm$^{-2}$ with near 100% capacity retention, indicating that a very high rate capability is achievable when using the highly concentrated electrolyte. An increase in the charge/discharge current densities, however, resulted in a slight decrease in the long-term cycling stability of the anode-free cell (FIG. 2C), likely due to the lower cycling CE of Li at increased current density (Zheng et al., *Adv. Energy Mater.* 2016, 1502151).

Example 2

Variable Rate Charge/Discharge of Anode-Free Lithium Batteries

Charging anode-free lithium cells (corresponding to Li deposition) slowly and discharging (corresponding to Li stripping) at a higher rate was found to improve the cycle life of Li metal batteries relative to cells cycled using other conditions such as charging and discharging at the same rate. The combination of a high concentration electrolyte (e.g., 4 M LiFSI-DME) and appropriate cycling protocols enabled an exceptionally high CE for Li cycling.

Figure 4A:
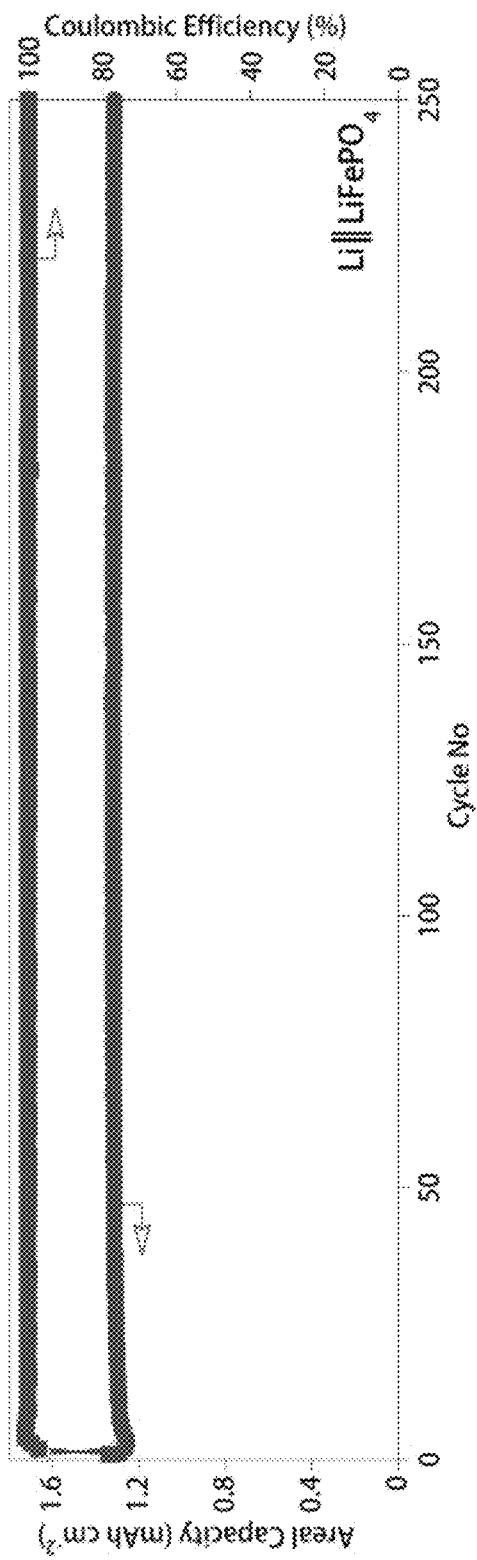
FIGS. 4A-4D show cycling performance of Cu||Li, Li||LiFePO$_4$, and Cu||LiFePO$_4$ cells with 4 M LiFSI/DME at different current densities.
Figure 4D:
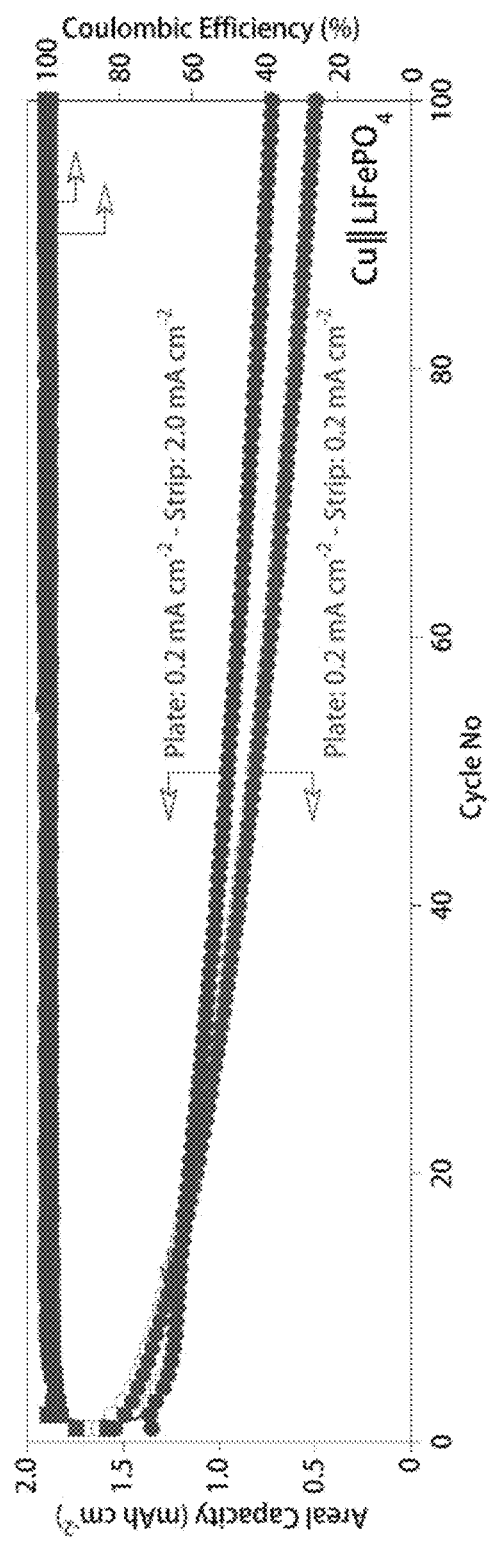
Figure 4B:
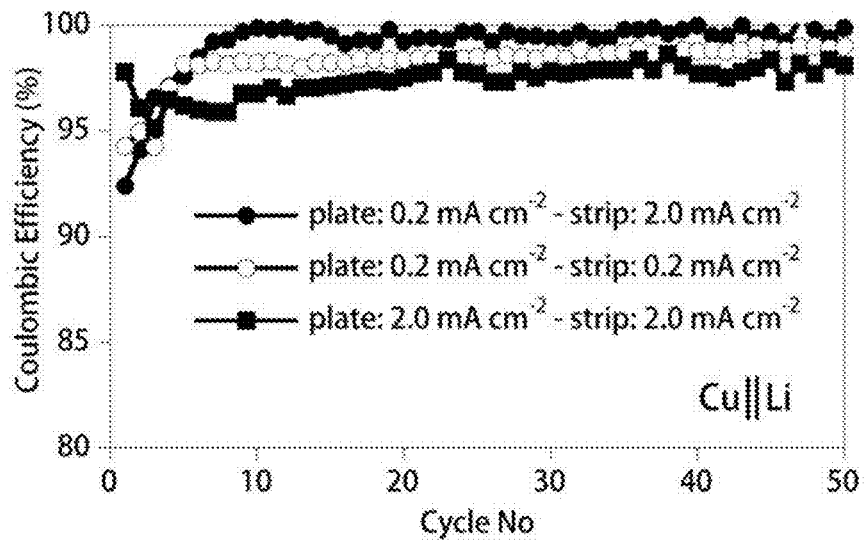

The improvement in the Li plating/stripping CE using the 4 M LiFSI-DME electrolyte and a variable rate cycling protocol is displayed in FIG. 4B. When Li was plated onto and stripped from a Cu substrate at a low current density of 0.2 mA cm$^{-2}$, the average CE between cycles 10 to 50 was 98.6%. When the Li plating/stripping was performed at a higher current density of 2.0 mA cm$^{-2}$, the average CE between cycles 10 to 50 cycles was decreased to 97.7% (FIG. 4B). But, when a variable low rate charge/high rate discharge protocol was used (charge or Li plating: 0.2 mA cm$^{-2}$; discharge or Li stripping: 2.0 mA cm$^{-2}$), the average CE between cycles 10 to 50 reached a very high value of 99.6% (FIG. 4B).

In addition to the cycling current rate protocol, the cycling capacity also plays an important role in stabilizing the SEI. In FIG. 4B, the Cu‖Li cells were charged to a capacity of 0.5 mAh cm$^{-2}$ (Li plating), whereas the Li‖LiFePO$_4$ and Cu‖LiFePO$_4$ cells shown in FIGS. 4A and 4D were limited by the capacity, i.e., Li content, of the Li$_{1-x}$FePO$_4$, which (initial value) ranged from ~1.4 to 1.6 mA cm$^{-2}$, depending on the current rate used.

To further confirm that Li plating/stripping at the Cu substrate was the limiting process in the anode-free cells, cells with a structure of Li‖LiFePO$_4$ were tested using the new cycling protocol. As is clearly evident in FIG. 4A, when an excess of Li was present, no capacity fading was observed and the average CE for the cell was ~100% when the cell was charged slowly (C/5 rate) and discharged quickly (2C rate). Cycling the anode-free Cu‖LiFePO$_4$ cell using the same low rate charge/high rate discharge protocol resulted in a notable improvement in the capacity retention. After 100 cycles, the discharge capacity was ~54% of its original value (FIG. 4D), which is a sizable increase relative to the cells using the same current density for both charge/discharge (FIGS. 2B and 2C) which retained only ~32% of their capacity. The average CE of the anode-free Cu‖LiFePO$_4$ cells increased from 98.8% when charged and discharged at 0.2 mA cm$^{-2}$ to 99.8% when the similar cell was cycled using a low rate (0.2 mA cm$^{-2}$) charge/high rate (2.0 mA cm$^{-2}$) discharge protocol (FIG. 4D).

Figure 4C:
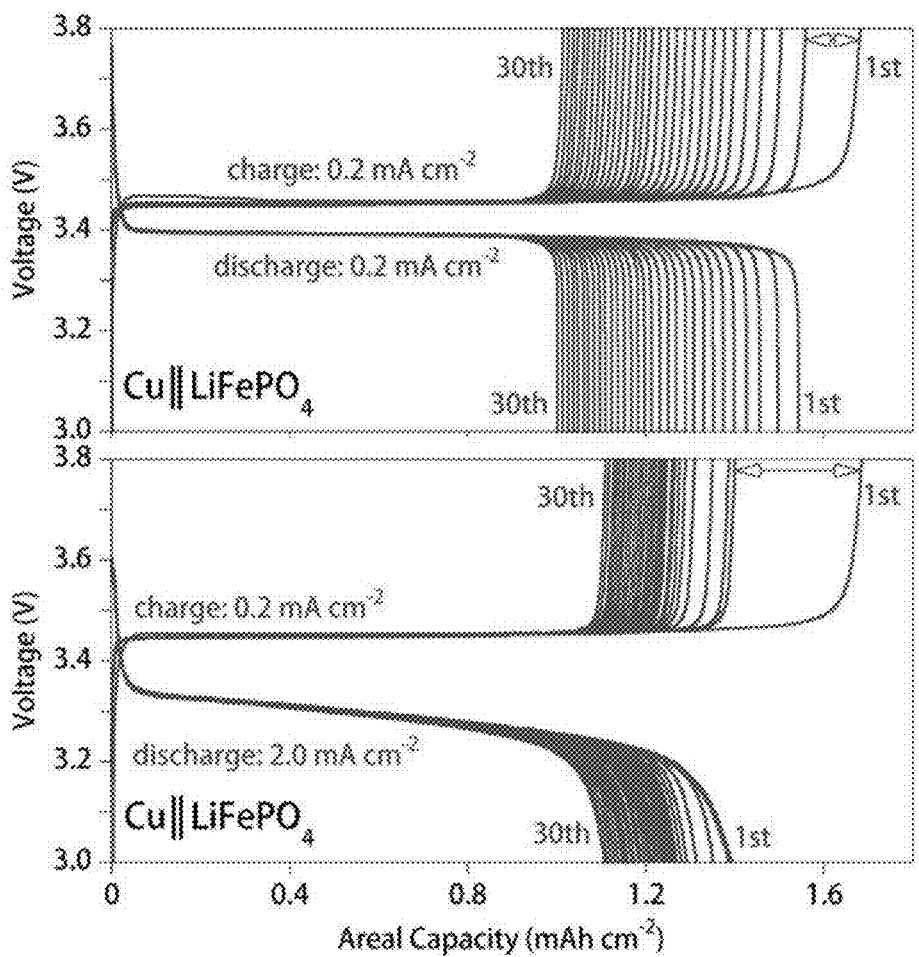

Although this may seem like a modest increase in the CE, Table 1 emphasizes how critical it is to achieve a nearly 100% CE to ensure the long term cyclability of anode-free batteries, as well as other Li metal batteries. By plating Li at low rates, large nodular deposits of Li are formed which limit the surface area of the Li (Qian, *Nat. Commun.* 2015, 6:6362), and which, in turn, limits the reactivity between the Li metal and the electrolyte. Additionally, at low current density, the high concentration of anions at the Li surface, which are coordinated to the Li$^+$ cations (and thus more susceptible to reduction than is the case for uncoordinated anions) results in more anion decomposition (relative to solvent decomposition) and thus a higher fraction of inorganic components within the SEI (Qian, *Nat. Commun.* 2015, 6:6362). Stripping the Li at high rates is also advantageous. In this case, the higher local concentration of Li$^+$ produced at the surface of Li (Li→Li$^+$+e$^-$), acts as a "barrier" to prevent reaction of fresh Li metal with anions and solvent molecules (Zheng et al., *Adv. Energy Mater.* 2016, 1502151). It is evident from both the Cu||Li and Cu||LiFePO$_4$ cell configurations (FIGS. 4B, 4C, and 4D) that it takes 10 cycles for the CE (and discharge capacity) to stabilize. Increasing charge current density in the initial cycles can largely accelerate the stabilization of the CE. For example, CE can be stabilized (reach more than 99%) within two cycles when the cycling current density is more than 3 mAh/cm$^2$.

The failure rate of anode-free cells is also affected by the cycling protocols and cell configurations. The failure rate is principally attributable to the relatively larger amount of excess Li which remains on the Cu substrate when discharging (Li stripped from the Cu substrate) at a high rate following the first charge (Li plating on the Cu) at a slow rate. This is highlighted in FIG. 4C with arrows indicating the excess charge capacity between the first and second cycles. When cells were cycled with little or no excess charge capacity (i.e. little to no Li remaining on the Cu), many of the anode-free cells tested failed within a few cycles. This failure mechanism occurs when all of the Li is stripped from the Cu surface since the cell voltage regulation becomes unstable because the Cu does not serve as a stable reference to control the operating voltage of the Li$_{1-x}$FePO$_4$ cathode. Without a stable Li reference, the charge/discharge voltages may be out of the stability range of the Li$_{1-x}$FePO$_4$, resulting in the rapid degradation of the cathode. The Cu substrate is also not stable when its voltage relative to Li/Li$^+$ is close to the voltage of Li$_{1-x}$FePO$_4$. In contrast, when a larger amount of Li remained on the Cu substrate, such cell failure did not occur.

Cells tested for 50 cycles were disassembled after being fully discharged, and both the anode current collectors (Cu) and cathodes were analyzed by XRD to understand their structural and compositional changes. As shown in FIG. 5A, after 50 cycles, the Li$_{1-x}$FePO$_4$ electrode cycled in 1 M LiPF$_6$-EC/DMC was completely transformed into FePO$_4$ with no Li remaining in the structure. This indicates that the Li was completely consumed and/or trapped (as dead Li) at the anode current collector. In contrast, the Li$_{1-x}$FePO$_4$ cathode cycled in 4 M LiFSI-DME consists of both Li$_{1-x}$FePO$_4$ and FePO$_4$ phases (FIG. 5A) suggesting that a significant amount of Li source was reserved and could be intercalated back into the cathode. The ratio between the LiFePO$_4$ and FePO$_4$ is estimated to be about 60:40 based upon the intensity ratio of the characteristic peaks assigned to LiFePO$_4$ (~17°) and FePO$_4$ (~18°), respectively. The percentage of the un-lithiated FePO$_4$ was in good agreement with the capacity loss (ca. 40% after 50 cycles), which is principally due to the electrolyte decomposition to form the SEI layer at the anode current collector.

XRD patterns of the residues on the Cu foils after cycling in the two electrolytes are also compared in FIG. 5B. The residue on the Cu collected from the cell cycled in 1 M LiPF$_6$-EC/DMC shows pronounced characteristic peaks of crystalline Li at 55, 81, 106 and 135°. The Li extracted from Li$_{1-x}$FePO$_4$ cathode is thus permanently trapped at the anode as dead Li on the Cu substrate. This lithium trapping causes the fast capacity degradation of the anode-free cell using the 1 M LiPF$_6$-EC/DMC electrolyte. In marked contrast, the XRD pattern of residue on the Cu formed using the 4 M LiFSI-DME electrolyte shows only a very weak signal for crystalline Li metal. This suggests that essentially all of the unreacted Li was successfully stripped during the cell discharge and inserted back into the Li$_{1-x}$FePO$_4$, even though part of the Li extracted from the Li$_{1-x}$FePO$_4$ cathode was consumed to form the SEI layer. As reported previously (Qian et al., *Nat. Commun.* 2015, 6:6362), the SEI layer formed in the 4 M LiFSI-DME electrolyte consists predominantly of LiF. In good agreement with the previous study, the low-intensity diffraction peaks here can be assigned to LiF.

Figure 7A:
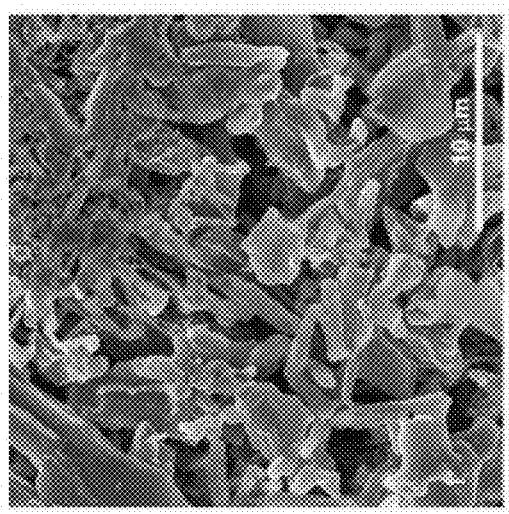
FIGS. 7A-7C are SEM images of lithium deposited on Cu foil in 1 M LiPF$_6$/EC-DMC electrolyte.
Figure 7B:
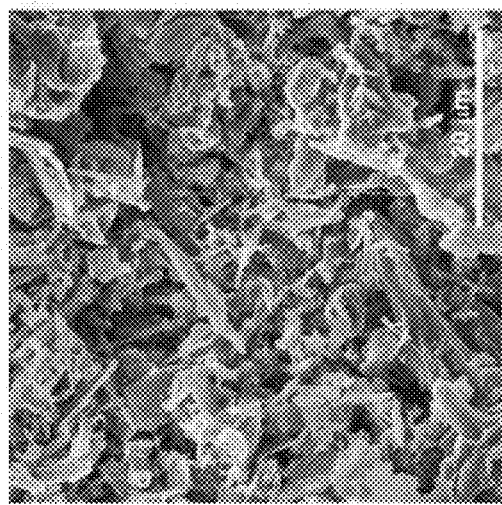
Figure 7C:
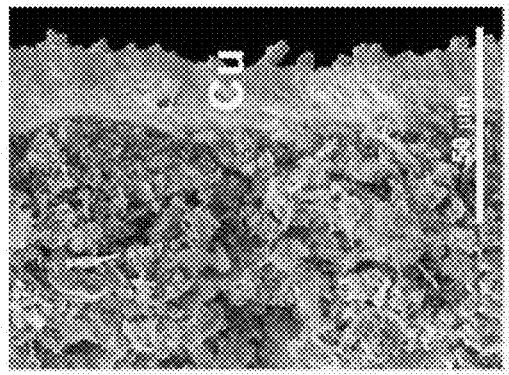
Figure 7D:
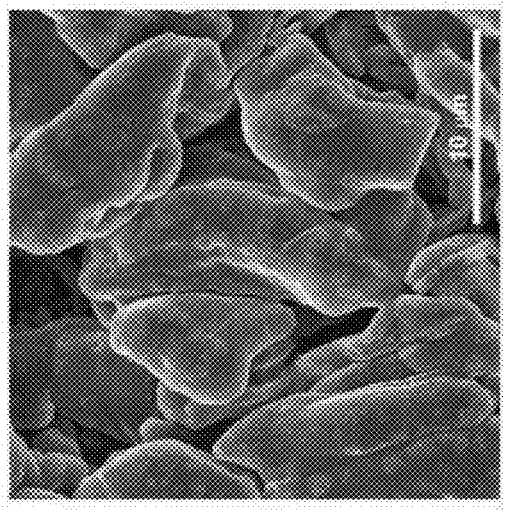
FIGS. 7D-7F are SEM images of lithium deposited on Cu foil in 4 M LiFSI/DME electrolyte.
Figure 7E:
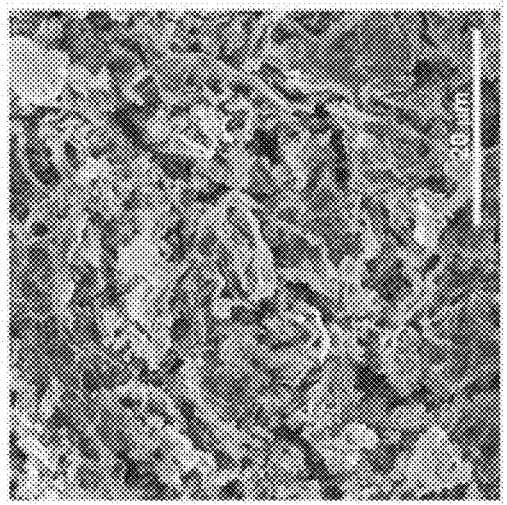
Figure 7F:
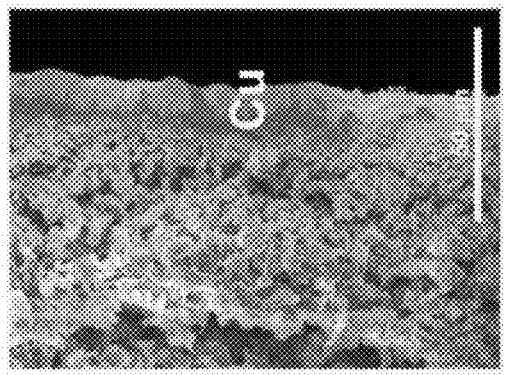

To obtain a better understanding of the evolution of the anode current collectors of the anode-free cells having different electrolytes, the morphologies of the anodes after the Li plating and of the residues on the Cu substrate after Li stripping after different cycles were further investigated. FIGS. 6A-6C show the optical photos of the Cu substrate after 1st cycle plating, 1st cycle stripping and 50th cycle stripping, respectively, with the 1 M LiPF$_6$-EC/DMC electrolyte. FIGS. 6D-6F show the optical photos of the Cu substrate after 1st cycle plating, 1st cycle stripping and 50th cycle stripping, respectively, with the 4 M LiFSI-DME electrolyte. FIGS. 7A and 7D compare the SEM images of the Li film plated on the Cu substrate after the initial Li plating process (corresponding to optical images in FIGS. 6A and 6D). FIGS. 7B and 7C are the top view and cross-section SEM images of the samples corresponding to FIG. 6C. FIGS. 7E and 7F are the top view and cross section SEM images of the samples corresponding to FIG. 6F. The cells were discharged at a current density of 0.5 mA cm$^{-2}$ for 3 h. Thus, the total amount of charge used for the Li plating was 1.5 mAh cm$^{-2}$, which is similar to that for the Li extracted from the LiFePO$_4$ cathode during the initial charge. As expected, the formation of needle-like dendrites of different lengths (5-10 μm) and diameters (~200 nm to 2 μm) was observed when Li was plated in the carbonate-based electrolyte (1 M LiPF$_6$-EC/DMC) at a relatively high current density (FIG. 7A). The formation of Li dendrites is undesired in Li metal batteries because they may penetrate through the separator, causing cell short circuit and safety issues, and their high surface area results in extensive reactions with the electrolyte. In contrast, the morphology of the Li surface plated in the 4 M LiFSI-DME electrolyte was compact and nodular, i.e., a compressed rubber-like material, which lacked the fibrous structure necessary to penetrate the porous polymer separator to generate a short-circuit (FIG. 7D). The formation of these large Li particles is also favorable for suppressing the side reactions between the Li and electrolyte, due to their relatively low surface area, thus ensuring the sustainable operation of the Li metal batteries, especially those with the anode-free configuration.

Because of the limited Li source in the anode-free cells, the principal stricture for the cell performance is the continuous consumption of Li in the formation/repair of the SEI layer. This SEI layer on the Li metal surface suppresses the further decomposition of the electrolyte components. However, if the SEI layer is inelastic, the SEI layer is disrupted in each Li plating/stripping cycle. The resulting SEI formation and reformation continuously consumes the active Li and the electrolyte, the extent of which can be quantified by measuring the CE, leading to the formation of a significant quantity of SEI residues on the Cu substrate. After 50 cycles, however, obvious differences from both optical and SEM images can be observed in the residues on the Cu substrates retrieved from the anode-free cells with the different electrolytes (FIGS. 7B and 7E).

For the cell with the 1 M LiPF$_6$-EC/DMC electrolyte, the residue after cycling looked dark grey, indicating a poor conductivity for this residual film (FIG. 6C). This grey residue was composed of micron size (>10 μm mossy/dead Li covered by a thick SEI layer (FIGS. 6B and 6C), as confirmed by the XRD characterization (FIG. 5B). Since the Li metal was covered by a poorly-conducting (electrically insulating) SEI layer which isolated the deposits from each other and from the Cu substrate, incomplete stripping of the SEI-wrapped Li occurred resulting in the trapping of a large amount of dead Li leading ultimately to cell failure.

In contrast, the residue on the Cu substrate after cycling in 4 M LiFSI-DME was black (FIG. 6F), which is often related to a high electronic conductivity (e.g., graphite). This SEI layer, however, is also rather porous (FIG. 6F). Most of the Li plated on the Cu substrate could be fully stripped and reinserted into the Li$_{1-x}$FePO$_4$, except for the portion consumed by the parasitic reactions. Even after 50 cycles, only a negligible amount of Li could be identified in this residue layer (FIG. 5B). Due to the low redox potential of Li (−3.04 V vs. SHE), the parasitic reactions between Li and the electrolyte components cannot be completely eliminated for a porous SEI which is partially disrupted during cycling, and which gradually consumes the limited Li source in the anode-free cells and accumulates as reaction byproducts on the Cu substrate, resulting in the slow, but continuous capacity loss during long-term cycling.

Figures 8A, 8B:
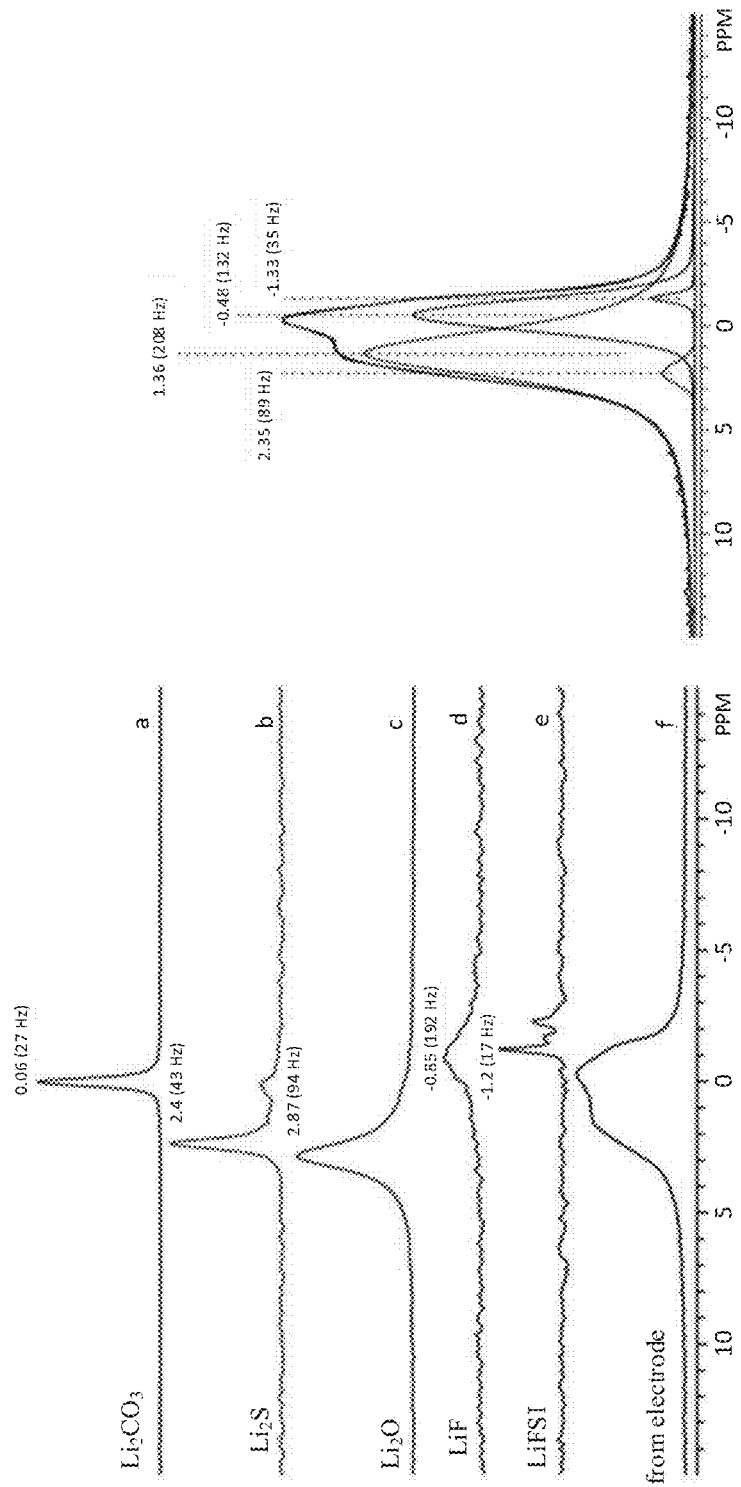
FIGS. 8A and 8B show NMR analysis of the Li-containing inorganic components of the SEI layer left as a residue on the Cu substrate which was recovered from a cell with 4.0 M LiFSI/DME electrolyte after cycling.

X-ray photoelectron spectroscopy analysis has shown previously that the build-up of the SEI layer formed in the 4 M LiFSI-DME electrolyte is closely related to slow anion decomposition during repeated cycling, generating a surface layer which has a significant portion of inorganic components. NMR was used to analyze the Li-containing inorganic components of the SEI layer left as a residue on the Cu substrate which was recovered from a cell with 4.0 M LiFSI/DME electrolyte after cycling (FIGS. 8A and 8B). A very broad peak ranging from −10~+10 ppm was observed for the SEI residues collected from the Cu substrate, which indicates that the SEI residues are composed of a variety of lithium salts. The fitting results of the NMR peak indicate that the inorganic components of the SEI residue on the Cu substrate are composed of LiF, Li$_2$S, Li$_2$O and a small amount of residual LiFSI salt, etc., based on their chemical shifts within the same range of the broad peak observed for SEI layer. Appearance of a significant amount of Li-containing inorganic compounds in the SEI layer enhanced the ionic conductivity and mechanical stability of the layer, and, in turn, the CE of Li cycling was improved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for cycling a rechargeable alkali metal battery, comprising:
    charging a rechargeable alkali metal battery at a first current density C1, wherein the rechargeable alkali metal battery prior to an initial charge cycle comprises
        (i) a cathode comprising M$^+$, where M is Li or Na,
        (ii) an anode current collector and no anode, or an anode current collector in physical contact with a thin layer of M having an average thickness from 1 μm to 20 μm,
        (iii) a separator disposed between the anode current collector and the cathode, and
        (iv) an electrolyte comprising a salt comprising M$^+$ dissolved in a non-aqueous solvent, the electrolyte having a concentration of M$^+$ within a range of 2.5 M to 8 M when M is Li, or a concentration of M$^+$ within a range of 2.5 M to 5 M when M is Na; and
    discharging the rechargeable alkali metal battery at a second current density C2, wherein C2≥5×C1 and the rechargeable alkali metal battery has a Coulombic efficiency ≥99.5%.

2. The method of claim 1, wherein C2 is within a range of from 5×C1 to 15×C1.

3. The method of claim 1, wherein the rechargeable alkali metal battery, prior to the initial charge cycle, comprises the thin layer of M on a surface of the anode current collector facing the separator.

4. The method of claim 3, wherein the thin layer of M, prior to an initial charge cycle, includes an amount of M that is ≤100 wt % of an amount of M oxidized during a single discharge cycle of the rechargeable alkali metal battery.

5. The method of claim 1, wherein the rechargeable alkali metal battery, prior to the initial charge cycle, does not comprise the thin layer of M or an anode.

6. The method of claim 1, wherein the electrolyte comprises lithium bis(fluorosulfonyl)imide (LiFSI) in an ether solvent.

7. The method of claim 6, wherein the electrolyte comprises 3-6 M LiFSI in 1,2-dimethoxyethane (DME).

8. The method of claim 1, wherein M is Na and the electrolyte comprises a nonaqueous solvent and sodium bis(fluorosulfonyl)imide (NaFSI) or a sodium salt mixture comprising at least 20 mol % NaFSI based on total sodium salt content.

9. The method of claim 8, wherein the nonaqueous solvent is an ether, an organic carbonate, or a mixture thereof.

10. The method of claim 8, wherein the electrolyte consists essentially of:
    (i) NaFSI or a sodium salt mixture consisting of (a) at least 20 mol % NaFSI based on total sodium salt content and (b) NaTFSI, NaPF$_6$, or NaTFSI and NaPF$_6$; and
    (ii) DME, diglyme, or tetrahydrofuran.

11. A method for cycling a rechargeable lithium metal battery, comprising:
    charging a rechargeable lithium metal battery at a first current density C1, wherein the rechargeable lithium metal battery prior to an initial charge cycle comprises
        (i) a cathode comprising Li$^+$,
        (ii) an anode current collector,
        (iii) a separator disposed between the anode current collector and the cathode, and
        (iv) an electrolyte comprising a salt comprising Li$^+$ dissolved in a non-aqueous ether solvent, the electrolyte having a concentration of Li$^+$ within a range of 2.5 M to 8 M; and
    discharging the rechargeable lithium metal battery at a second current density C2, wherein C2≥5×C1 and the rechargeable lithium metal battery has a Coulombic efficiency ≥99.5%.

12. The method of claim 11, wherein C1≤0.7 mA/cm$^2$.

13. The method of claim 11, wherein the rechargeable lithium metal battery further comprises a thin layer of lithium on a surface of the anode current collector facing the separator, the thin layer having an average thickness of 1 μm to 20 μm.

14. The method of claim 13, wherein the thin layer of lithium includes an amount of lithium that is ≤100 wt % of an amount of lithium oxidized during a single discharge cycle of the rechargeable lithium metal battery.

15. A method for cycling a rechargeable sodium metal battery, comprising:
   charging a rechargeable sodium metal battery at a first current density C1, wherein the rechargeable sodium metal battery prior to an initial charge cycle comprises
   (i) a cathode comprising $Na^+$,
   (ii) an anode current collector,
   (iii) a separator disposed between the anode current collector and the cathode, and
   (iv) an electrolyte comprising (a) a nonaqueous solvent comprising an ether, an organic carbonate, or a mixture thereof, and (b) sodium bis(fluorosulfonyl) imide (NaFSI) or a sodium salt mixture comprising at least 20 mol % NaFSI based on total sodium salt content, wherein the electrolyte has a total sodium salt concentration of 2.5-5 M; and
   discharging the rechargeable sodium metal battery at a second current density C2, wherein C2≥5×C1 and the rechargeable alkali metal battery has a Coulombic efficiency ≥99.5%.

16. The method of claim 15, wherein the rechargeable sodium metal battery further comprises a thin layer of sodium on a surface of the anode current collector facing the separator, the thin layer having an average thickness of 1 μm to 20 μm.

17. The method of claim 16, wherein the thin layer of sodium includes an amount of sodium that is ≤100 wt % of an amount of sodium oxidized during a single discharge cycle of the rechargeable sodium metal battery.

18. The method of claim 1, wherein:
   (i) C1 is 0.1 mA/cm$^2$ to 0.7 mA/cm$^2$; or
   (ii) C2 is 1.5 mA cm$^{-2}$ to 4 mA cm$^{-2}$; or
   (iii) both (i) and (ii).

19. The method of claim 1, wherein C1 is C/5 and C2 is 2C.

* * * * *